(12) United States Patent
MacKay et al.

(10) Patent No.: US 11,762,479 B2
(45) Date of Patent: Sep. 19, 2023

(54) SPI KEYBOARD MODULE FOR A PARKING METER AND A PARKING METER HAVING AN SPI KEYBOARD MODULE

(71) Applicant: J.J. MacKay Canada Limited, New Glasgow (CA)

(72) Inventors: George A. MacKay, New Glasgow (CA); James G. MacKay, Frasers Mountain (CA); Adrian I. O'Neil, New Glasgow (CA); Gregory E. Chauvin, Brookside (CA); Neil S. Erskine, Halifax (CA)

(73) Assignee: J.J. MACKAY CANADA LIMITED, New Glasgow (CA)

( * ) Notice: Subject to any disclaimer, the term of this patent is extended or adjusted under 35 U.S.C. 154(b) by 0 days.

(21) Appl. No.: 16/774,099

(22) Filed: Jan. 28, 2020

(65) Prior Publication Data
US 2020/0241652 A1 Jul. 30, 2020

(30) Foreign Application Priority Data

Jan. 30, 2019 (CA) ...................................... 3031936

(51) Int. Cl.
*G06F 3/023* (2006.01)
*G06F 16/903* (2019.01)
(Continued)

(52) U.S. Cl.
CPC ............ *G06F 3/023* (2013.01); *G06F 3/0219* (2013.01); *G06F 3/04886* (2013.01);
(Continued)

(58) Field of Classification Search
CPC ............... G06F 13/4282; G06F 3/0219; G06F 16/90335; G06F 3/023; G06F 16/909;
(Continued)

(56) References Cited

U.S. PATENT DOCUMENTS 480,108 A 8/1892 Loch
1,189,991 A 7/1916 Mugler
(Continued)

FOREIGN PATENT DOCUMENTS

AT 507762 A1 5/2017
AU 4035701 9/2001
(Continued)

OTHER PUBLICATIONS

Duncan Solutions "Single-Space Meters" brochure (2 pages); Rev. 04/06, 2006 Duncan Solutions, Inc.
(Continued)

*Primary Examiner* — Yaron Cohen
(74) *Attorney, Agent, or Firm* — Neal L. Slifkin; Harris Beach, PLLC

(57) ABSTRACT

A serial peripheral interface (SPI) keyboard module for a parking meter comprises a plurality of key switches and at least one controller configured to detect a key press, determine a predetermined indicator associated with the pressed key and transmit the indicator to a keyboard interface of the parking meter. The SPI keyboard module provides a low power keyboard module that can be easily adapted to provide different keyboards or layouts without requiring significant changes to the parking meter electronics.

24 Claims, 12 Drawing Sheets

(51) Int. Cl.
*G06F 3/02* (2006.01)
*G06F 3/04886* (2022.01)
*G06Q 20/34* (2012.01)

(52) U.S. Cl.
CPC ....... *G06F 16/90335* (2019.01); *G06Q 20/34* (2013.01); *G06Q 2240/00* (2013.01)

(58) Field of Classification Search
CPC .... G06F 3/04886; G06Q 20/18; G06Q 20/34; G06Q 2240/00; G07F 17/24; Y02D 10/00
See application file for complete search history.

(56) References Cited

U.S. PATENT DOCUMENTS

| | | |
|---|---|---|
| 1,445,771 A | 2/1923 | Keplinger |
| 1,818,568 A | 8/1931 | Melick |
| D98,810 S | 3/1936 | Magee |
| D100,875 S | 8/1936 | Michaels et al. |
| D101,237 S | 9/1936 | Miller |
| D106,561 S | 10/1937 | Broussard et al. |
| D107,577 S | 12/1937 | McGay et al. |
| 2,118,318 A | 5/1938 | Magee |
| D112,677 S | 12/1938 | Broussard et al. |
| 2,161,046 A | 6/1939 | Rockols |
| D116,805 S | 9/1939 | Reznek et al. |
| 2,229,183 A | 1/1941 | Mitchell |
| 2,261,353 A | 11/1941 | Fedele |
| 2,289,838 A | 7/1942 | Herschede et al. |
| D152,294 S | 1/1949 | Siegel et al. |
| D152,587 S | 2/1949 | Brundage |
| D154,716 S | 8/1949 | Simpson |
| 2,483,805 A | 10/1949 | Broussard et al. |
| 2,495,784 A | 1/1950 | Starts |
| D161,888 S | 2/1951 | Wilkin |
| D162,698 S | 3/1951 | Teague |
| 2,546,433 A | 3/1951 | Dick |
| 2,547,272 A | 4/1951 | Lawson et al. |
| 2,550,433 A | 4/1951 | Tichenor |
| 2,570,920 A | 10/1951 | Clough et al. |
| D166,059 S | 2/1952 | Menhall |
| 2,594,388 A | 4/1952 | Broussard |
| 2,595,124 A | 4/1952 | Campbell |
| D166,753 S | 5/1952 | Jones |
| 2,596,122 A | 5/1952 | Broussard |
| 2,596,123 A | 5/1952 | Broussard |
| 2,596,124 A | 5/1952 | Broussard |
| 2,596,126 A | 5/1952 | Carhart et al. |
| 2,599,881 A | 6/1952 | Woodruff |
| 2,613,792 A | 10/1952 | Broussard et al. |
| 2,613,871 A | 10/1952 | Broussard et al. |
| 2,618,371 A | 11/1952 | Broussard |
| 2,633,960 A | 4/1953 | Broussard |
| D181,359 S | 11/1957 | Jones |
| 2,818,371 A | 12/1957 | Wessinger |
| 2,822,682 A | 2/1958 | Sollenberger |
| 2,832,506 A | 4/1958 | Hatcher |
| D189,106 S | 10/1960 | Leiderman |
| 2,956,525 A | 10/1960 | Blauvelt |
| 2,985,978 A | 5/1961 | Breen et al. |
| 2,988,191 A | 6/1961 | Grant |
| 2,995,230 A | 8/1961 | Moody et al. |
| 3,018,615 A | 1/1962 | Minton et al. |
| 3,046,774 A | 7/1962 | Glock |
| 3,056,544 A | 10/1962 | Sollenberger et al. |
| D199,270 S | 9/1964 | Michales |
| D200,216 S | 2/1965 | Broussard et al. |
| 3,183,411 A | 5/1965 | Palfi |
| 3,199,321 A | 8/1965 | Sollenberger |
| 3,204,438 A | 9/1965 | Sollenberger |
| 3,208,061 A | 9/1965 | Gervasi et al. |
| 3,262,540 A | 7/1966 | Sollenberger et al. |
| 3,272,299 A | 9/1966 | Sollenberger |
| 3,324,647 A | 6/1967 | Jedynak |
| 3,373,856 A | 3/1968 | Kusters et al. |
| 3,438,031 A | 4/1969 | Fathauer |
| 3,486,324 A | 12/1969 | Andersson |
| 3,519,113 A | 7/1970 | Arzig et al. |
| 3,535,870 A | 10/1970 | Mitchell |
| 3,565,283 A | 2/1971 | Sciacero et al. |
| 3,637,277 A | 1/1972 | Krug et al. |
| 3,666,067 A | 5/1972 | Kaiser |
| 3,694,590 A | 9/1972 | Otterlei |
| 3,721,463 A | 3/1973 | Attwood et al. |
| 3,770,090 A | 11/1973 | Fayling et al. |
| D230,511 S | 2/1974 | Stieber |
| 3,858,165 A | 12/1974 | Pegg |
| D234,606 S | 3/1975 | Gamble |
| D235,801 S | 7/1975 | Gore |
| 3,941,989 A | 3/1976 | McLaughlin et al. |
| 3,964,590 A | 6/1976 | Corporation |
| 3,975,934 A | 8/1976 | Babai et al. |
| 3,982,620 A | 9/1976 | Kortenhaus |
| 3,991,595 A | 11/1976 | Bahry et al. |
| 3,999,372 A | 12/1976 | Welch et al. |
| 4,007,564 A | 2/1977 | Chisholm |
| 4,025,791 A | 5/1977 | Lennington et al. |
| 4,031,991 A | 6/1977 | Malott |
| 4,037,700 A | 7/1977 | Heraty |
| 4,043,117 A | 8/1977 | Maresca et al. |
| D246,917 S | 1/1978 | Sauter |
| 4,147,707 A | 4/1979 | Alewelt et al. |
| 4,237,710 A | 12/1980 | Cardozo |
| 4,248,336 A | 2/1981 | Fiedler |
| 4,249,648 A | 2/1981 | Meyer |
| 4,264,963 A | 4/1981 | Leach |
| 4,306,219 A | 12/1981 | Main et al. |
| 4,310,890 A | 1/1982 | Trehn et al. |
| 4,317,180 A | 2/1982 | Lies |
| 4,317,181 A | 2/1982 | Teza et al. |
| 4,323,847 A | 4/1982 | Karbowski |
| 4,379,334 A | 4/1983 | Allright |
| 4,409,665 A | 10/1983 | Tubbs |
| D272,291 S | 1/1984 | Hauser et al. |
| 4,432,447 A | 2/1984 | Tanaka |
| 4,460,080 A | 7/1984 | Howard |
| 4,460,965 A | 7/1984 | Trehn et al. |
| 4,474,281 A | 10/1984 | Roberts et al. |
| 4,479,191 A | 10/1984 | Nojima et al. |
| 4,483,431 A | 11/1984 | Pratt |
| D278,689 S | 5/1985 | Jupe |
| 4,574,936 A | 3/1986 | Klinger |
| 4,615,280 A | 10/1986 | Shoop et al. |
| 4,639,021 A | 1/1987 | Hope |
| D288,441 S | 2/1987 | Lalonde |
| D289,914 S | 5/1987 | Willinger et al. |
| 4,678,994 A | 7/1987 | Davies |
| 4,742,903 A | 5/1988 | Trummer |
| 4,749,074 A | 6/1988 | Ueki et al. |
| 4,754,126 A | 6/1988 | Caldwell |
| D296,795 S | 7/1988 | Bouve |
| 4,763,769 A | 8/1988 | Levasseur |
| 4,798,273 A | 1/1989 | Ward, II |
| 4,809,838 A | 3/1989 | Houserman |
| 4,812,805 A | 3/1989 | Lachat et al. |
| 4,823,928 A | 4/1989 | Speas |
| 4,825,425 A | 4/1989 | Turner |
| 4,827,206 A | 5/1989 | Speas |
| 4,845,484 A | 7/1989 | Ellsberg |
| 4,848,556 A | 7/1989 | Shah et al. |
| 4,851,987 A | 7/1989 | Day |
| 4,872,149 A | 10/1989 | Speas |
| 4,875,598 A | 10/1989 | Dahl |
| 4,880,097 A | 11/1989 | Incorporated |
| 4,880,406 A | 11/1989 | Van Horn et al. |
| 4,895,238 A | 1/1990 | Speas |
| 4,951,799 A | 8/1990 | Kai |
| 4,967,895 A | 11/1990 | Speas |
| 4,967,985 A | 11/1990 | Deakin |
| 4,976,630 A | 12/1990 | Schuder et al. |
| 4,989,714 A | 2/1991 | Abe |
| 5,027,390 A | 6/1991 | Hughes |
| 5,027,935 A | 7/1991 | Berg et al. |
| 5,029,094 A | 7/1991 | Wong |

(56) References Cited

U.S. PATENT DOCUMENTS

| | | |
|---|---|---|
| D319,077 S | 8/1991 | Arato et al. |
| 5,036,859 A | 8/1991 | Brown |
| 5,060,777 A | 10/1991 | Van Horn et al. |
| 5,065,156 A | 11/1991 | Bernier |
| 5,076,414 A | 12/1991 | Kimoto |
| 5,088,073 A | 2/1992 | Speas |
| 5,109,972 A | 5/1992 | Van Horn et al. |
| 5,119,916 A | 6/1992 | Carmen et al. |
| 5,142,277 A | 8/1992 | Yarberry et al. |
| 5,155,614 A | 10/1992 | Carmen et al. |
| 5,158,166 A | 10/1992 | Limited |
| D331,996 S | 12/1992 | Fukutake et al. |
| 5,184,707 A | 2/1993 | Van Horn et al. |
| 5,192,855 A | 3/1993 | Ab |
| 5,194,707 A | 3/1993 | Wallach |
| 5,201,396 A | 4/1993 | Chalabian et al. |
| D335,460 S | 5/1993 | Tanaka |
| D336,860 S | 6/1993 | Clough |
| 5,222,076 A | 6/1993 | Ng et al. |
| D337,953 S | 8/1993 | Verborn et al. |
| 5,244,070 A | 9/1993 | Carmen et al. |
| D340,038 S | 10/1993 | Venne et al. |
| 5,259,491 A | 11/1993 | Ward, II |
| 5,266,947 A | 11/1993 | Fujiwara et al. |
| D342,209 S | 12/1993 | Clough |
| 5,273,151 A | 12/1993 | Carmen et al. |
| 5,287,384 A | 2/1994 | Inc. |
| 5,293,979 A | 3/1994 | Levasseur |
| 5,298,894 A | 3/1994 | Cerny et al. |
| 5,339,594 A | 8/1994 | Ventura-Berti |
| 5,343,237 A | 8/1994 | Morimoto |
| 5,351,187 A | 9/1994 | Hassett |
| D351,193 S | 10/1994 | Abe |
| 5,351,798 A | 10/1994 | Hayes |
| 5,360,095 A | 11/1994 | Speas |
| D354,047 S | 1/1995 | Leggate et al. |
| D354,835 S | 1/1995 | Brendel |
| 5,382,780 A | 1/1995 | Carmen |
| 5,402,475 A | 3/1995 | Lesner, Jr. et al. |
| 5,407,049 A | 4/1995 | Yost |
| 5,426,363 A | 6/1995 | Akagi et al. |
| D360,734 S | 7/1995 | Hall |
| D360,737 S | 7/1995 | Helbig, Jr. |
| 5,439,089 A | 8/1995 | Parker |
| 5,442,348 A | 8/1995 | Mushell |
| 5,454,461 A | 10/1995 | Yost |
| D364,165 S | 11/1995 | Esslinger |
| 5,471,139 A | 11/1995 | Zadoff |
| 5,475,373 A | 12/1995 | Speas |
| 5,489,014 A | 2/1996 | Menoud |
| 5,500,517 A | 3/1996 | Cagliostro |
| 5,507,378 A | 4/1996 | Corporation |
| 5,526,662 A | 6/1996 | Diekhoff et al. |
| 5,563,491 A | 10/1996 | Tseng |
| 5,568,441 A | 10/1996 | Sanemitsu |
| D375,607 S | 11/1996 | Hall |
| 5,570,771 A | 11/1996 | Yost |
| 5,614,892 A | 3/1997 | Ward, II et al. |
| 5,617,942 A | 4/1997 | Ward, II et al. |
| 5,619,932 A | 4/1997 | Efland et al. |
| 5,640,002 A | 6/1997 | Ruppert et al. |
| 5,642,119 A | 6/1997 | Intelligent |
| 5,648,906 A | 7/1997 | Amirpanahi |
| D381,796 S | 8/1997 | Kittle et al. |
| D381,976 S | 8/1997 | Sandor et al. |
| 5,659,306 A | 8/1997 | Bahar |
| 5,687,129 A | 11/1997 | Kim |
| D388,227 S | 12/1997 | Dallman et al. |
| D388,231 S | 12/1997 | Magee et al. |
| 5,710,743 A | 1/1998 | Dee et al. |
| D391,238 S | 2/1998 | Sakata |
| 5,732,812 A | 3/1998 | Grainger et al. |
| D393,212 S | 4/1998 | Lucas et al. |
| 5,737,710 A | 4/1998 | Anthonyson |
| 5,740,050 A | 4/1998 | Ward, II |
| 5,748,103 A | 5/1998 | Flach et al. |
| D395,133 S | 6/1998 | Mikami et al. |
| 5,761,061 A | 6/1998 | Amano |
| 5,777,302 A | 7/1998 | Konami |
| 5,777,951 A | 7/1998 | Mitschele et al. |
| 5,777,957 A | 7/1998 | Lyman |
| 5,778,067 A | 7/1998 | Jones et al. |
| D396,655 S | 8/1998 | Anderson |
| 5,792,298 A | 8/1998 | Sauer et al. |
| 5,803,228 A | 9/1998 | Lucas |
| 5,805,083 A | 9/1998 | Sutton et al. |
| 5,806,651 A | 9/1998 | Carmen et al. |
| D400,115 S | 10/1998 | Yaron |
| D400,684 S | 11/1998 | Dallman |
| 5,833,042 A | 11/1998 | Baitch et al. |
| 5,841,369 A | 11/1998 | Sutton et al. |
| 5,842,411 A | 12/1998 | Johnson |
| 5,845,268 A | 12/1998 | Moore |
| 5,852,411 A | 12/1998 | Jacobs et al. |
| D404,025 S | 1/1999 | Van Horne et al. |
| 5,903,520 A | 5/1999 | Dee et al. |
| 5,906,260 A | 5/1999 | Inc. |
| 5,911,763 A | 6/1999 | Quesada |
| 5,915,246 A | 6/1999 | Patterson et al. |
| D411,848 S | 7/1999 | Maruska et al. |
| D412,233 S | 7/1999 | Cajacob et al. |
| D412,289 S | 7/1999 | Winwood |
| D413,311 S | 8/1999 | Blalock |
| 5,936,527 A | 8/1999 | Isaacman et al. |
| 5,940,481 A | 8/1999 | Zeitman |
| 5,946,774 A | 9/1999 | Ramsey et al. |
| 5,954,182 A | 9/1999 | Wei |
| 5,966,345 A | 10/1999 | Dee et al. |
| D419,277 S | 1/2000 | Ishii et al. |
| 6,018,327 A | 1/2000 | Nakano et al. |
| 6,026,946 A | 2/2000 | Pom |
| 6,029,888 A | 2/2000 | Harvey |
| D421,399 S | 3/2000 | Bennett et al. |
| 6,037,880 A | 3/2000 | Manion |
| D423,181 S | 4/2000 | Dallman |
| D423,755 S | 4/2000 | Ha |
| 6,052,453 A | 4/2000 | Sagady et al. |
| D427,413 S | 6/2000 | Wallace et al. |
| 6,078,272 A | 6/2000 | Jacobs et al. |
| 6,081,205 A | 6/2000 | Williams |
| 6,081,206 A | 6/2000 | Kielland |
| 6,082,153 A | 7/2000 | Schoell et al. |
| D430,045 S | 8/2000 | Omuro et al. |
| 6,098,361 A | 8/2000 | Roten et al. |
| 6,107,942 A | 8/2000 | Yoo et al. |
| 6,109,418 A | 8/2000 | Yost |
| D430,810 S | 9/2000 | Omuro et al. |
| 6,116,403 A | 9/2000 | Kiehl |
| 6,121,880 A | 9/2000 | Scott et al. |
| D431,788 S | 10/2000 | Tuxen et al. |
| D432,286 S | 10/2000 | Irie |
| 6,132,152 A | 10/2000 | Kaibach et al. |
| 6,147,624 A | 11/2000 | Clapper |
| D437,468 S | 2/2001 | Fukutake et al. |
| 6,188,328 B1 | 2/2001 | Ho |
| 6,193,045 B1 | 2/2001 | Conlux |
| 6,195,015 B1 | 2/2001 | Jacobs et al. |
| D439,591 S | 3/2001 | Reidt et al. |
| RE37,193 E | 5/2001 | Ward, II et al. |
| 6,227,343 B1 | 5/2001 | Neathway et al. |
| 6,229,455 B1 | 5/2001 | Yost et al. |
| 6,230,868 B1 | 5/2001 | Tuxen et al. |
| 6,236,716 B1 | 5/2001 | Marcus et al. |
| 6,243,028 B1 | 6/2001 | Krygler et al. |
| 6,243,029 B1 | 6/2001 | Tomer |
| 6,275,169 B1 | 8/2001 | Krygler et al. |
| 6,275,170 B1 | 8/2001 | Intelligent |
| D447,519 S | 9/2001 | Pinchuk et al. |
| D447,714 S | 9/2001 | Cappiello |
| D448,910 S | 10/2001 | Kit et al. |
| D449,010 S | 10/2001 | Petrucelli |
| 6,307,152 B1 | 10/2001 | Bonilla et al. |
| 6,309,098 B1 | 10/2001 | Wong |
| D450,253 S | 11/2001 | Marguet |

(56) References Cited

U.S. PATENT DOCUMENTS

| | | |
|---|---|---|
| 6,312,152 B2 | 11/2001 | Dee et al. |
| 6,321,201 B1 | 11/2001 | Dahl |
| RE37,531 E | 1/2002 | Chaco et al. |
| 6,340,935 B1 | 1/2002 | Hall |
| 6,344,806 B1 | 2/2002 | Katz |
| D454,421 S | 3/2002 | Jeon et al. |
| D454,807 S | 3/2002 | Cappiello |
| 6,354,425 B1 | 3/2002 | Tuxen et al. |
| 6,366,220 B1 | 4/2002 | Elliott |
| 6,373,401 B2 | 4/2002 | Ho |
| 6,373,422 B1 | 4/2002 | Incorporated |
| 6,373,442 B1 | 4/2002 | Thomas et al. |
| 6,380,851 B1 | 4/2002 | Gilbert et al. |
| D460,005 S | 7/2002 | Jacquet |
| D461,728 S | 8/2002 | Tuxen et al. |
| 6,456,491 B1 | 9/2002 | Flannery et al. |
| D463,749 S | 10/2002 | Petrucelli |
| 6,457,586 B2 | 10/2002 | Yasuda et al. |
| 6,477,505 B2 | 11/2002 | Ward, II et al. |
| 6,477,785 B1 | 11/2002 | Hsu |
| 6,477,875 B2 | 11/2002 | Field et al. |
| D467,954 S | 12/2002 | Suzuki et al. |
| 6,493,676 B1 | 12/2002 | Levy |
| 6,505,774 B1 | 1/2003 | Fulcher et al. |
| D471,238 S | 3/2003 | Showers et al. |
| D472,362 S | 3/2003 | Zerman et al. |
| 6,527,172 B1 | 3/2003 | Lewis et al. |
| 6,539,370 B1 | 3/2003 | Chang et al. |
| 6,559,776 B2 | 5/2003 | Katz |
| 6,575,281 B2 | 6/2003 | Lee |
| D477,030 S | 7/2003 | Kolls et al. |
| D481,516 S | 10/2003 | Magee et al. |
| D485,417 S | 1/2004 | Magee et al. |
| 6,697,730 B2 | 2/2004 | Dickerson |
| D488,280 S | 4/2004 | Zerman et al. |
| 6,731,942 B1 | 5/2004 | Nageli |
| D490,727 S | 6/2004 | Kido et al. |
| D492,080 S | 6/2004 | Magee et al. |
| D492,081 S | 6/2004 | Magee et al. |
| D492,085 S | 6/2004 | Korte et al. |
| 6,747,575 B2 | 6/2004 | Chauvin et al. |
| 6,763,094 B2 | 7/2004 | Conn et al. |
| D494,730 S | 8/2004 | Magee et al. |
| 6,791,473 B2 | 9/2004 | Kibria et al. |
| RE38,626 E | 10/2004 | Kielland |
| D497,393 S | 10/2004 | Herbst |
| 6,799,387 B2 | 10/2004 | Pippins |
| D497,814 S | 11/2004 | Odinotski et al. |
| D498,795 S | 11/2004 | Nunn |
| 6,812,857 B1 | 11/2004 | Kassab et al. |
| 6,823,317 B1 | 11/2004 | Ouimet et al. |
| 6,856,922 B1 | 2/2005 | Austin et al. |
| 6,874,340 B1 | 4/2005 | Berman |
| 6,885,311 B2 | 4/2005 | Howard et al. |
| D505,240 S | 5/2005 | Swaine et al. |
| D505,765 S | 5/2005 | Swaine et al. |
| 6,889,899 B2 | 5/2005 | Silberberg |
| D506,509 S | 6/2005 | Nunn |
| D506,769 S | 6/2005 | Asai |
| 6,914,411 B2 | 7/2005 | Couch et al. |
| D508,064 S | 8/2005 | Ramirez |
| 6,929,179 B2 | 8/2005 | Fulcher et al. |
| 6,936,505 B2 | 8/2005 | Bengtsson et al. |
| 6,946,974 B1 | 9/2005 | Racunas, Jr. |
| D510,751 S | 10/2005 | Magee et al. |
| 7,004,385 B1 | 2/2006 | Douglass |
| 7,014,355 B2 | 3/2006 | Potter, Sr. et al. |
| 7,019,420 B2 | 3/2006 | Kogan et al. |
| 7,019,670 B2 | 3/2006 | Bahar |
| 7,023,360 B2 | 4/2006 | Staniszewski |
| 7,027,773 B1 | 4/2006 | McMillin |
| 7,027,808 B2 | 4/2006 | Wesby |
| 7,028,888 B2 | 4/2006 | Laskowski |
| 7,029,167 B1 | 4/2006 | Mitschele |
| D520,883 S | 5/2006 | Hillard et al. |
| 7,040,534 B2 | 5/2006 | Turocy et al. |
| 7,046,123 B1 | 5/2006 | Goldberg |
| D524,834 S | 7/2006 | Dozier et al. |
| 7,071,839 B2 | 7/2006 | Patel et al. |
| 7,104,447 B1 | 9/2006 | Lopez et al. |
| 7,110,762 B1 | 9/2006 | Cameron et al. |
| D530,880 S | 10/2006 | Magee et al. |
| 7,114,651 B2 | 10/2006 | Hjelmvik |
| 7,131,576 B2 | 11/2006 | Utz et al. |
| D535,268 S | 1/2007 | Holger |
| 7,181,426 B2 | 2/2007 | Dutta |
| 7,183,999 B2 | 2/2007 | Matthews et al. |
| D538,505 S | 3/2007 | Kang et al. |
| 7,188,070 B2 | 3/2007 | Dar et al. |
| D543,588 S | 5/2007 | Herbert et al. |
| 7,222,031 B2 | 5/2007 | Heatley |
| 7,222,782 B2 | 5/2007 | Lute, Jr. et al. |
| 7,230,545 B2 | 6/2007 | Nath et al. |
| 7,237,176 B2 | 6/2007 | Briggs et al. |
| D546,365 S | 7/2007 | Jost et al. |
| 7,237,716 B2 | 7/2007 | Silberberg |
| 7,253,747 B2 | 8/2007 | Noguchi |
| 7,262,737 B2 | 8/2007 | Zarnowitz et al. |
| 7,284,692 B1 | 10/2007 | Douglass |
| D559,792 S | 1/2008 | Gemme et al. |
| 7,319,974 B1 | 1/2008 | Brusseaux |
| 7,321,317 B2 | 1/2008 | Nath et al. |
| 7,330,131 B2 | 2/2008 | Zanotti et al. |
| 7,347,368 B1 | 3/2008 | Gravelle et al. |
| D570,920 S | 6/2008 | Choi |
| 7,382,238 B2 | 6/2008 | Kavaler |
| 7,382,281 B2 | 6/2008 | Kavaler |
| 7,382,282 B2 | 6/2008 | Kavaler |
| 7,385,484 B2 | 6/2008 | Nath et al. |
| 7,388,349 B2 | 6/2008 | Elder et al. |
| 7,388,517 B2 | 6/2008 | Kavaler |
| 7,391,339 B2 | 6/2008 | Howard et al. |
| 7,393,134 B2 | 7/2008 | Mitschele |
| D575,168 S | 8/2008 | King et al. |
| 7,419,091 B1 | 9/2008 | Scanlon |
| 7,427,931 B1 | 9/2008 | Kavaler et al. |
| D579,795 S | 11/2008 | Martinez et al. |
| 7,445,144 B2 | 11/2008 | Schlabach et al. |
| D582,125 S | 12/2008 | Kang et al. |
| D587,141 S | 2/2009 | King et al. |
| D588,916 S | 3/2009 | DeMarco |
| D591,181 S | 4/2009 | Kanbar |
| D592,825 S | 5/2009 | Kang et al. |
| 7,533,802 B1 | 5/2009 | McGinley et al. |
| 7,533,809 B1 | 5/2009 | Robinson et al. |
| 7,554,460 B2 | 6/2009 | Verkleeren et al. |
| D596,373 S | 7/2009 | Kang et al. |
| D596,374 S | 7/2009 | Kang et al. |
| 7,558,564 B2 | 7/2009 | Wesby |
| 7,575,166 B2 | 8/2009 | McNamara |
| 7,579,964 B2 | 8/2009 | Nath et al. |
| 7,594,235 B2 | 9/2009 | Moreau |
| D602,225 S | 10/2009 | Lute et al. |
| D604,189 S | 11/2009 | Leer et al. |
| 7,611,045 B1 | 11/2009 | Lute et al. |
| 7,617,120 B2 | 11/2009 | Derasmo et al. |
| D605,145 S | 12/2009 | Kellar |
| 7,624,919 B2 | 12/2009 | Meek et al. |
| 7,632,419 B1 | 12/2009 | Grimbergen et al. |
| 7,671,803 B2 | 3/2010 | Neill et al. |
| 7,679,526 B2 | 3/2010 | Mardirossian |
| 7,699,224 B2 | 4/2010 | Molé |
| D615,274 S | 5/2010 | Kim et al. |
| 7,717,327 B2 | 5/2010 | Gomes |
| D617,799 S | 6/2010 | Odhe et al. |
| 7,726,558 B1 | 6/2010 | Lute et al. |
| 7,739,000 B2 | 6/2010 | Kevaler |
| D620,050 S | 7/2010 | Hultzman et al. |
| 7,748,620 B2 | 7/2010 | Gomez et al. |
| 7,772,720 B2 | 8/2010 | McGee et al. |
| 7,780,072 B1 | 8/2010 | Lute et al. |
| 7,783,530 B2 | 8/2010 | Slemmer et al. |
| D624,274 S | 9/2010 | Pendleton |
| D625,305 S | 10/2010 | Bleck et al. |

(56) References Cited

U.S. PATENT DOCUMENTS

| | | |
|---|---|---|
| 7,806,248 B2 | 10/2010 | Hunter et al. |
| D627,814 S | 11/2010 | Tzeng et al. |
| 7,825,826 B2 | 11/2010 | Welch |
| D629,585 S | 12/2010 | Bleck et al. |
| 7,854,310 B2 | 12/2010 | King et al. |
| 7,855,661 B2 | 12/2010 | Ponert |
| 7,874,482 B2 | 1/2011 | Mitschele |
| D632,740 S | 2/2011 | Adeline |
| 7,891,546 B1 | 2/2011 | Steinbach et al. |
| D634,417 S | 3/2011 | Abbondanzio et al. |
| D635,035 S | 3/2011 | Matsumoto |
| 7,899,583 B2 | 3/2011 | Mendelson |
| 7,908,149 B2 | 3/2011 | Dar et al. |
| 7,933,841 B2 | 4/2011 | Schmeyer et al. |
| 7,945,670 B2 | 5/2011 | Nakamura et al. |
| D645,223 S | 9/2011 | Bleck et al. |
| 8,035,533 B2 | 10/2011 | Kavaler |
| 8,044,139 B2 | 10/2011 | Youn et al. |
| D652,329 S | 1/2012 | MacKay et al. |
| D652,872 S | 1/2012 | Mougin et al. |
| D653,014 S | 1/2012 | Rohan et al. |
| D653,420 S | 1/2012 | Rohan et al. |
| D653,421 S | 1/2012 | Rohan et al. |
| D653,424 S | 1/2012 | Rohan et al. |
| D654,816 S | 2/2012 | MacKay et al. |
| RE43,245 E | 3/2012 | Ouimet et al. |
| D655,263 S | 3/2012 | Tsai |
| D656,046 S | 3/2012 | MacKay et al. |
| 8,138,950 B1 | 3/2012 | Leung |
| 8,144,034 B2 | 3/2012 | Kavaler |
| D659,557 S | 5/2012 | Jones et al. |
| 8,181,857 B1 | 5/2012 | Lute et al. |
| 8,184,019 B2 | 5/2012 | Limited |
| D661,603 S | 6/2012 | MacKay et al. |
| D661,608 S | 6/2012 | Kimmich |
| 8,193,540 B2 | 6/2012 | Huang et al. |
| 8,207,394 B2 | 6/2012 | Feldkamp et al. |
| 8,232,894 B2 | 7/2012 | Weiss et al. |
| 8,250,887 B2 | 8/2012 | Mackay |
| 8,264,401 B1 | 9/2012 | Kavaler |
| 8,279,107 B2 | 10/2012 | Krstanovic et al. |
| D672,525 S | 12/2012 | Lee et al. |
| 8,325,057 B2 | 12/2012 | Salter |
| D674,985 S | 1/2013 | Lee |
| D677,035 S | 2/2013 | Lee et al. |
| D677,714 S | 3/2013 | Helgesson et al. |
| 8,395,532 B2 | 3/2013 | Chauvin et al. |
| 8,402,281 B2 | 3/2013 | Dahl |
| 8,402,380 B2 | 3/2013 | Kikin-Gil et al. |
| D680,156 S | 4/2013 | Hernandez et al. |
| 8,417,715 B1 | 4/2013 | Bruckhaus et al. |
| D681,717 S | 5/2013 | Helgesson et al. |
| D682,504 S | 5/2013 | Lee et al. |
| 8,450,627 B2 | 5/2013 | Inc. |
| D683,779 S | 6/2013 | Uemachi et al. |
| D683,794 S | 6/2013 | Randall |
| D683,795 S | 6/2013 | Randall |
| D684,745 S | 6/2013 | Reuter et al. |
| D684,870 S | 6/2013 | Jones et al. |
| 8,479,909 B2 | 7/2013 | King et al. |
| 8,487,754 B2 | 7/2013 | Mitschele |
| D687,809 S | 8/2013 | Bergmann et al. |
| 8,513,832 B2 | 8/2013 | Hunter et al. |
| D689,554 S | 9/2013 | Echanove Hernandez |
| D690,771 S | 10/2013 | Randall |
| D691,165 S | 10/2013 | Attoma |
| 8,566,159 B2 | 10/2013 | King et al. |
| 8,568,055 B2 | 10/2013 | Marques Lito Velez Grilo |
| D692,784 S | 11/2013 | Anderssen et al. |
| D693,983 S | 11/2013 | Budde et al. |
| 8,573,484 B1 | 11/2013 | Irudayam et al. |
| 8,589,216 B2 | 11/2013 | Yu et al. |
| 8,590,687 B2 | 11/2013 | King et al. |
| 8,595,054 B2 | 11/2013 | Inc. |
| D696,484 S | 12/2013 | Lee et al. |
| D696,485 S | 12/2013 | Lee et al. |
| 8,621,245 B2 | 12/2013 | Shearer et al. |
| 8,631,921 B2 | 1/2014 | Jones et al. |
| 8,662,279 B2 | 3/2014 | Jones et al. |
| 8,666,801 B2 | 3/2014 | Cho |
| D702,913 S | 4/2014 | Budde et al. |
| D702,914 S | 4/2014 | Budde et al. |
| 8,684,158 B2 | 4/2014 | Jones et al. |
| 8,710,798 B2 | 4/2014 | Turner |
| D705,090 S | 5/2014 | MacKay et al. |
| D707,140 S | 6/2014 | King et al. |
| D707,141 S | 6/2014 | King et al. |
| D707,142 S | 6/2014 | King et al. |
| D707,574 S | 6/2014 | Ku et al. |
| 8,749,403 B2 | 6/2014 | Inc. |
| 8,770,371 B2 | 7/2014 | Mackay et al. |
| 8,770,372 B2 | 7/2014 | Dobbins et al. |
| 8,807,317 B2 | 8/2014 | MacKay et al. |
| D714,165 S | 9/2014 | Salama |
| D716,156 S | 10/2014 | Jones et al. |
| D716,157 S | 10/2014 | MacKay et al. |
| D716,515 S | 10/2014 | Cha et al. |
| 8,862,494 B2 | 10/2014 | King et al. |
| 8,866,624 B2 | 10/2014 | Ales, III et al. |
| D716,671 S | 11/2014 | Jones et al. |
| 8,884,785 B2 | 11/2014 | Groft et al. |
| 8,936,505 B2 | 1/2015 | Bengtsson |
| D722,740 S | 2/2015 | Budde et al. |
| 8,957,787 B1 | 2/2015 | Al-Hmalan et al. |
| D724,290 S | 3/2015 | Cha et al. |
| D724,811 S | 3/2015 | Reitinger |
| D724,812 S | 3/2015 | Cha et al. |
| D725,504 S | 3/2015 | McEneany et al. |
| D728,190 S | 4/2015 | Sheley |
| D732,263 S | 6/2015 | Budde et al. |
| 9,064,358 B2 | 6/2015 | Lidror |
| D733,585 S | 7/2015 | Jones et al. |
| D735,437 S | 7/2015 | Randall |
| D735,438 S | 7/2015 | Randall |
| D735,439 S | 7/2015 | Randall |
| D735,440 S | 7/2015 | Randall |
| D735,963 S | 8/2015 | Randall |
| D735,964 S | 8/2015 | Randall |
| D735,965 S | 8/2015 | Randall |
| D739,637 S | 9/2015 | Randall |
| D739,638 S | 9/2015 | Randall |
| D739,639 S | 9/2015 | Randall |
| 9,123,184 B2 | 9/2015 | Jones et al. |
| 9,127,964 B2 | 9/2015 | Schwarz et al. |
| 9,147,345 B2 | 9/2015 | Agrait et al. |
| D741,040 S | 10/2015 | Budde et al. |
| D742,090 S | 10/2015 | Randall |
| 9,159,080 B2 | 10/2015 | Fiorucci et al. |
| 9,169,626 B2 | 10/2015 | Guler et al. |
| D742,371 S | 11/2015 | Bopp et al. |
| D743,956 S | 11/2015 | Kraft et al. |
| 9,196,097 B2 | 11/2015 | Jones et al. |
| 9,196,161 B2 | 11/2015 | Lai et al. |
| D746,015 S | 12/2015 | King et al. |
| D746,704 S | 1/2016 | Jones et al. |
| D748,364 S | 1/2016 | King et al. |
| D748,888 S | 2/2016 | King et al. |
| D749,000 S | 2/2016 | King et al. |
| D749,290 S | 2/2016 | Pollmann |
| 9,269,216 B2 | 2/2016 | Keilwert |
| D750,513 S | 3/2016 | King et al. |
| D750,978 S | 3/2016 | van Slooten et al. |
| D752,552 S | 3/2016 | D'Ascanio et al. |
| D755,649 S | 5/2016 | King et al. |
| D755,650 S | 5/2016 | King et al. |
| D756,807 S | 5/2016 | King et al. |
| D756,808 S | 5/2016 | King et al. |
| D762,040 S | 7/2016 | King et al. |
| 9,384,554 B2 | 7/2016 | Xu et al. |
| 9,391,474 B2 | 7/2016 | Hunter et al. |
| 9,406,056 B2 | 8/2016 | Mackay et al. |
| 9,407,608 B2 | 8/2016 | Mullick et al. |
| 9,443,236 B2 | 9/2016 | Mackay |
| D769,570 S | 10/2016 | Kraft et al. |

(56) References Cited

U.S. PATENT DOCUMENTS

| | | |
|---|---|---|
| D769,571 S | 10/2016 | Lee et al. |
| D769,572 S | 10/2016 | Park et al. |
| 9,489,776 B2 | 11/2016 | Keller et al. |
| 9,494,922 B2 | 11/2016 | MacKay et al. |
| 9,508,260 B2 | 11/2016 | Shaik |
| 9,519,761 B2 | 12/2016 | Jakobsson |
| 9,524,498 B2 | 12/2016 | Jones et al. |
| 9,536,235 B2 | 1/2017 | Jones et al. |
| 9,536,370 B2 | 1/2017 | Jones et al. |
| D779,771 S | 2/2017 | King et al. |
| D779,772 S | 2/2017 | King et al. |
| D779,773 S | 2/2017 | King et al. |
| D779,774 S | 2/2017 | King et al. |
| 9,580,198 B2 | 2/2017 | Ehrmann et al. |
| D781,024 S | 3/2017 | King et al. |
| 9,601,018 B2 | 3/2017 | Cogill et al. |
| 9,652,921 B2 | 5/2017 | MacKay et al. |
| 9,685,027 B2 | 6/2017 | King et al. |
| 9,692,256 B2 | 6/2017 | Hunter et al. |
| D791,621 S | 7/2017 | Loye et al. |
| D792,049 S | 7/2017 | Oh et al. |
| 9,697,506 B2 | 7/2017 | Jones et al. |
| 9,707,911 B1 | 7/2017 | Myers et al. |
| D795,523 S | 8/2017 | King et al. |
| 9,728,085 B2 | 8/2017 | Schwarz et al. |
| 9,749,823 B2 | 8/2017 | Rowe et al. |
| 9,773,351 B2 | 9/2017 | Hudson et al. |
| D799,992 S | 10/2017 | Ehara |
| 9,779,565 B2 | 10/2017 | Rabbat |
| 9,805,518 B2 | 10/2017 | King et al. |
| D802,874 S | 11/2017 | King et al. |
| D802,875 S | 11/2017 | King et al. |
| D802,876 S | 11/2017 | King et al. |
| D802,877 S | 11/2017 | King et al. |
| D802,878 S | 11/2017 | King et al. |
| 9,842,346 B2 | 12/2017 | Fiorucci et al. |
| 9,842,455 B2 | 12/2017 | MacKay et al. |
| D813,059 S | 3/2018 | MacKay et al. |
| 9,934,645 B2 | 4/2018 | MacKay et al. |
| 10,069,233 B2 | 9/2018 | Goto |
| D832,553 S | 10/2018 | Angelopoulos et al. |
| 10,089,814 B2 | 10/2018 | King et al. |
| 10,141,629 B2 | 11/2018 | MacKay et al. |
| 10,154,029 B1 | 12/2018 | Griffin |
| 10,192,388 B2 | 1/2019 | MacKay et al. |
| 10,275,650 B2 | 4/2019 | Laaksonen |
| 10,297,150 B2 | 5/2019 | Schwarz et al. |
| 10,299,018 B1 | 5/2019 | King et al. |
| D851,605 S | 6/2019 | Maetani et al. |
| D852,454 S | 6/2019 | King et al. |
| 10,315,665 B2 | 6/2019 | Halder |
| D853,079 S | 7/2019 | King et al. |
| D853,678 S | 7/2019 | King et al. |
| D853,679 S | 7/2019 | King et al. |
| 10,366,546 B2 | 7/2019 | King et al. |
| 10,423,980 B2 | 9/2019 | King et al. |
| 10,424,147 B2 | 9/2019 | MacKay et al. |
| D863,074 S | 10/2019 | MacKay et al. |
| D863,075 S | 10/2019 | MacKay et al. |
| D863,076 S | 10/2019 | MacKay et al. |
| D863,987 S | 10/2019 | MacKay et al. |
| D863,988 S | 10/2019 | MacKay et al. |
| D865,315 S | 10/2019 | King et al. |
| 10,464,530 B2 | 11/2019 | Falkson et al. |
| 10,491,972 B2 | 11/2019 | King et al. |
| 10,503,990 B2 | 12/2019 | Gleeson-May et al. |
| D872,600 S | 1/2020 | King et al. |
| 10,573,953 B2 | 2/2020 | MacKay et al. |
| 10,574,085 B2 | 2/2020 | Hunter et al. |
| D879,404 S | 3/2020 | Morishito et al. |
| D883,605 S | 5/2020 | Lee et al. |
| 10,664,880 B2 | 5/2020 | King et al. |
| 10,674,236 B2 | 6/2020 | King et al. |
| 10,691,904 B1 | 6/2020 | Randall et al. |
| 10,741,064 B2 | 8/2020 | Schwarz et al. |
| 10,861,278 B2 | 12/2020 | MacKay et al. |
| D911,857 S | 3/2021 | King et al. |
| RE48,566 E | 5/2021 | Mackay et al. |
| 10,998,612 B2 | 5/2021 | MacKay et al. |
| 11,074,612 B2 | 7/2021 | King et al. |
| 11,100,824 B2 | 8/2021 | King et al. |
| 11,132,723 B2 | 9/2021 | King et al. |
| 11,172,274 B2 | 11/2021 | King et al. |
| D955,230 S | 6/2022 | King et al. |
| D955,231 S | 6/2022 | King et al. |
| 11,386,420 B2 | 7/2022 | Nolan et al. |
| D959,298 S | 8/2022 | Jones et al. |
| D959,299 S | 8/2022 | Jones et al. |
| D959,997 S | 8/2022 | Jones et al. |
| 11,423,776 B2 | 8/2022 | Schwarz et al. |
| 11,430,027 B2 | 8/2022 | King et al. |
| 11,436,649 B2 | 9/2022 | King et al. |
| 11,462,109 B2 | 10/2022 | King et al. |
| 11,475,491 B2 | 10/2022 | King et al. |
| D971,033 S | 11/2022 | King et al. |
| D971,034 S | 11/2022 | King et al. |
| D971,035 S | 11/2022 | King et al. |
| 2001/0012241 A1 | 8/2001 | Dee et al. |
| 2001/0027626 A1 | 10/2001 | Natelli, Jr. |
| 2001/0037928 A1 | 11/2001 | Bench et al. |
| 2001/0047278 A1 | 11/2001 | Brookner et al. |
| 2001/0051531 A1 | 12/2001 | Singhal et al. |
| 2002/0008639 A1 | 1/2002 | Dee |
| 2002/0030606 A1 | 3/2002 | Chauvin et al. |
| 2002/0062172 A1 | 5/2002 | Bench |
| 2002/0063035 A1 | 5/2002 | Blad et al. |
| 2002/0074344 A1 | 6/2002 | Long et al. |
| 2002/0080013 A1 | 6/2002 | Anderson, III et al. |
| 2002/0100810 A1 | 8/2002 | Amadeo |
| 2002/0109609 A1 | 8/2002 | Potter, Sr. et al. |
| 2002/0109610 A1 | 8/2002 | Katz |
| 2002/0109611 A1 | 8/2002 | Howard |
| 2002/0111768 A1 | 8/2002 | Ghorayeb et al. |
| 2002/0134645 A1 | 9/2002 | Alexander et al. |
| 2003/0010821 A1 | 1/2003 | Silberberg |
| 2003/0017904 A1 | 1/2003 | Lee |
| 2003/0058084 A1 | 3/2003 | O'Hara |
| 2003/0092387 A1 | 5/2003 | Hjelmvik |
| 2003/0112151 A1 | 6/2003 | Chauvin et al. |
| 2003/0112597 A1 | 6/2003 | Smith |
| 2003/0117904 A1 | 6/2003 | Lank et al. |
| 2003/0121754 A1 | 7/2003 | King |
| 2003/0128010 A1 | 7/2003 | Hsu |
| 2003/0128136 A1 | 7/2003 | Spier et al. |
| 2003/0132840 A1 | 7/2003 | Bahar |
| 2003/0135407 A1 | 7/2003 | Reinhardt et al. |
| 2003/0140531 A1 | 7/2003 | Pippins |
| 2003/0144905 A1 | 7/2003 | Smith |
| 2003/0144972 A1 | 7/2003 | Cordery et al. |
| 2003/0169183 A1 | 9/2003 | Korepanov et al. |
| 2003/0179107 A1 | 9/2003 | Kibria et al. |
| 2003/0220835 A1 | 11/2003 | Barnes, Jr. |
| 2003/0222792 A1 | 12/2003 | Berman et al. |
| 2003/0229793 A1 | 12/2003 | McCall et al. |
| 2003/0234888 A1 | 12/2003 | Hong et al. |
| 2004/0011099 A1 | 1/2004 | Andersson |
| 2004/0016796 A1 | 1/2004 | Hanna et al. |
| 2004/0039632 A1 | 2/2004 | Han et al. |
| 2004/0040028 A1 | 2/2004 | Moreau |
| 2004/0059693 A1 | 3/2004 | Hausen et al. |
| 2004/0068434 A1 | 4/2004 | Kanekon |
| 2004/0084278 A1 | 5/2004 | Harris et al. |
| 2004/0094619 A1 | 5/2004 | Silberberg |
| 2004/0160905 A1 | 8/2004 | Bernier et al. |
| 2004/0160906 A1 | 8/2004 | Greszczuk et al. |
| 2004/0181496 A1 | 9/2004 | Odinotski et al. |
| 2004/0207530 A1 | 10/2004 | Nielsen |
| 2004/0232878 A1 | 11/2004 | Couch et al. |
| 2004/0243526 A1 | 12/2004 | Krygler et al. |
| 2004/0254840 A1 | 12/2004 | Slemmer et al. |
| 2004/0254900 A1 | 12/2004 | Reinhard |
| 2004/0262379 A1 | 12/2004 | Gomes |
| 2004/0263117 A1 | 12/2004 | Kogan |
| 2004/0264302 A1 | 12/2004 | Ward, II |

(56) References Cited

U.S. PATENT DOCUMENTS

| | | |
|---|---|---|
| 2005/0001779 A1 | 1/2005 | Copeland et al. |
| 2005/0029340 A1 | 2/2005 | Ferraro |
| 2005/0035740 A1 | 2/2005 | Elder et al. |
| 2005/0040951 A1 | 2/2005 | Zalewski et al. |
| 2005/0068201 A1 | 3/2005 | Wulff et al. |
| 2005/0099320 A1 | 5/2005 | Nath et al. |
| 2005/0102075 A1 | 5/2005 | Dar et al. |
| 2005/0155839 A1 | 7/2005 | Banks et al. |
| 2005/0168352 A1 | 8/2005 | Tomer |
| 2005/0178639 A1 | 8/2005 | Brumfield et al. |
| 2005/0192911 A1 | 9/2005 | Mattern |
| 2005/0216354 A1 | 9/2005 | Vayusa |
| 2005/0226201 A1 | 10/2005 | McMillin |
| 2006/0020487 A1 | 1/2006 | Spittel et al. |
| 2006/0021848 A1 | 2/2006 | Smith |
| 2006/0028919 A1 | 2/2006 | Mitschele |
| 2006/0052055 A1 | 3/2006 | Rowse et al. |
| 2006/0072286 A1 | 4/2006 | Tseng |
| 2006/0114159 A1 | 6/2006 | Yoshikawa et al. |
| 2006/0116972 A1 | 6/2006 | Wong |
| 2006/0136131 A1 | 6/2006 | Dugan et al. |
| 2006/0149684 A1 | 7/2006 | Matsuura et al. |
| 2006/0152349 A1 | 7/2006 | Ratnakar |
| 2006/0152385 A1 | 7/2006 | Mandy |
| 2006/0173733 A1 | 8/2006 | Fancher |
| 2006/0227010 A1 | 10/2006 | Berstis et al. |
| 2006/0255119 A1 | 11/2006 | Marchasin et al. |
| 2006/0259354 A1 | 11/2006 | Yan |
| 2006/0267799 A1 | 11/2006 | Mendelson |
| 2007/0011700 A1 | 1/2007 | Johnson |
| 2007/0016539 A1 | 1/2007 | Groft et al. |
| 2007/0017265 A1 | 1/2007 | Andersson |
| 2007/0029825 A1 | 2/2007 | Franklin et al. |
| 2007/0040449 A1 | 2/2007 | Spurlin et al. |
| 2007/0044523 A1 | 3/2007 | Davis |
| 2007/0046651 A1 | 3/2007 | Sinclair |
| 2007/0061155 A1 | 3/2007 | Ji et al. |
| 2007/0074702 A1 | 4/2007 | Nakamura et al. |
| 2007/0094153 A1 | 4/2007 | Ferraro |
| 2007/0114849 A1 | 5/2007 | Falik et al. |
| 2007/0119682 A1 | 5/2007 | Banks et al. |
| 2007/0129974 A1 | 6/2007 | Chen et al. |
| 2007/0136128 A1 | 6/2007 | Janacek et al. |
| 2007/0171069 A1 | 7/2007 | Allen |
| 2007/0184852 A1 | 8/2007 | Johnson et al. |
| 2007/0189907 A1 | 8/2007 | Kunihiro et al. |
| 2007/0208499 A1 | 9/2007 | Kwong |
| 2007/0210935 A1 | 9/2007 | Yost et al. |
| 2007/0276724 A1 | 11/2007 | Catt |
| 2007/0285281 A1 | 12/2007 | Welch |
| 2008/0052254 A1 | 2/2008 | Al Amri |
| 2008/0061967 A1 | 3/2008 | Corrado |
| 2008/0071611 A1 | 3/2008 | Lovett |
| 2008/0093454 A1 | 4/2008 | Yamazaki et al. |
| 2008/0147268 A1 | 6/2008 | Fuller |
| 2008/0158010 A1 | 7/2008 | Nath et al. |
| 2008/0165030 A1 | 7/2008 | Kuo et al. |
| 2008/0208680 A1 | 8/2008 | Cho |
| 2008/0218383 A1 | 9/2008 | Franklin et al. |
| 2008/0238715 A1 | 10/2008 | Cheng et al. |
| 2008/0245638 A1 | 10/2008 | King et al. |
| 2008/0257965 A1 | 10/2008 | Klein et al. |
| 2008/0265019 A1 | 10/2008 | Artino et al. |
| 2008/0266138 A1 | 10/2008 | Ponert |
| 2008/0270227 A1 | 10/2008 | Al Amri |
| 2008/0277468 A1 | 11/2008 | Mitschele |
| 2008/0289030 A1 | 11/2008 | Poplett |
| 2008/0291054 A1 | 11/2008 | Groft |
| 2008/0296365 A1 | 12/2008 | Schliebe |
| 2008/0319837 A1 | 12/2008 | Mitschele |
| 2009/0026842 A1 | 1/2009 | Hunter et al. |
| 2009/0032368 A1 | 2/2009 | Hunter et al. |
| 2009/0049875 A1 | 2/2009 | Buhl et al. |
| 2009/0057398 A1 | 3/2009 | Douglass et al. |
| 2009/0083149 A1 | 3/2009 | Maekawa et al. |
| 2009/0095593 A1 | 4/2009 | King et al. |
| 2009/0099761 A1 | 4/2009 | Davis et al. |
| 2009/0102726 A1 | 4/2009 | Imano et al. |
| 2009/0109062 A1 | 4/2009 | An |
| 2009/0121889 A1 | 5/2009 | Lin et al. |
| 2009/0137204 A1 | 5/2009 | Chang et al. |
| 2009/0146796 A1 | 6/2009 | Goto et al. |
| 2009/0159674 A1 | 6/2009 | King et al. |
| 2009/0174528 A1 | 7/2009 | Toda et al. |
| 2009/0177580 A1 | 7/2009 | Lowenthal et al. |
| 2009/0183966 A1 | 7/2009 | King et al. |
| 2009/0192950 A1 | 7/2009 | King et al. |
| 2009/0199966 A1 | 8/2009 | Coleman et al. |
| 2009/0254438 A1 | 10/2009 | Johnson, Jr. et al. |
| 2009/0256707 A1 | 10/2009 | Uschold et al. |
| 2009/0267732 A1 | 10/2009 | Chauvin et al. |
| 2009/0284907 A1 | 11/2009 | Regimbal et al. |
| 2009/0287578 A1 | 11/2009 | Paluszek et al. |
| 2009/0315720 A1 | 12/2009 | Clement et al. |
| 2010/0019936 A1 | 1/2010 | Kaveler |
| 2010/0025459 A1 | 2/2010 | Yamada |
| 2010/0026522 A1 | 2/2010 | Ward, II |
| 2010/0030629 A1 | 2/2010 | Ward, II |
| 2010/0032266 A1 | 2/2010 | Stephan |
| 2010/0103100 A1 | 4/2010 | Yamamoto |
| 2010/0106517 A1 | 4/2010 | Kociubinski et al. |
| 2010/0116883 A1 | 5/2010 | Cost et al. |
| 2010/0153193 A1 | 6/2010 | Ashby et al. |
| 2010/0161489 A1 | 6/2010 | Goodall et al. |
| 2010/0168694 A1 | 7/2010 | Gakhar et al. |
| 2010/0185325 A1 | 7/2010 | Kwon |
| 2010/0187300 A1 | 7/2010 | Ramachandran et al. |
| 2010/0188932 A1 | 7/2010 | Hanks et al. |
| 2010/0241056 A1 | 9/2010 | Lehtoluoto |
| 2010/0241564 A1 | 9/2010 | Miller et al. |
| 2010/0243729 A1 | 9/2010 | Russell et al. |
| 2010/0328104 A1 | 12/2010 | Groft |
| 2010/0332394 A1 | 12/2010 | Ioli |
| 2501/1002242 | 1/2011 | Dayan |
| 2011/0037562 A1 | 2/2011 | Braukmann et al. |
| 2011/0057815 A1 | 3/2011 | King et al. |
| 2011/0060653 A1 | 3/2011 | King et al. |
| 2011/0062230 A1 | 3/2011 | Ward, II et al. |
| 2011/0063133 A1 | 3/2011 | Keller et al. |
| 2011/0066297 A1 | 3/2011 | Saberi et al. |
| 2011/0093314 A1 | 4/2011 | Redmann et al. |
| 2011/0106329 A1 | 5/2011 | Donnelly et al. |
| 2011/0122036 A1 | 5/2011 | Leung et al. |
| 2011/0133613 A1 | 6/2011 | Parkeon |
| 2011/0158331 A1 | 6/2011 | Kavaler et al. |
| 2011/0203901 A1 | 8/2011 | King et al. |
| 2011/0204847 A1 | 8/2011 | Turner |
| 2011/0205087 A1 | 8/2011 | Kell et al. |
| 2011/0210827 A1 | 9/2011 | Lidror |
| 2011/0213656 A1 | 9/2011 | Turner |
| 2011/0218940 A1 | 9/2011 | Bergstrom et al. |
| 2011/0221624 A1 | 9/2011 | Sensys |
| 2011/0222957 A1 | 9/2011 | Marques Lito Velez Grilo |
| 2011/0241442 A1 | 10/2011 | Mittleman et al. |
| 2011/0241604 A1 | 10/2011 | Anderson |
| 2011/0261548 A1 | 10/2011 | Gandhi |
| 2011/0276519 A1 | 11/2011 | MacKay et al. |
| 2011/0289985 A1 | 12/2011 | MacKay et al. |
| 2011/0313822 A1 | 12/2011 | Burdick |
| 2011/0316716 A1 | 12/2011 | MacKay et al. |
| 2011/0320243 A1 | 12/2011 | Khan |
| 2011/0320256 A1 | 12/2011 | Fiorucci et al. |
| 2012/0026015 A1 | 2/2012 | Kavaler |
| 2012/0073222 A1 | 3/2012 | Sargentini |
| 2012/0078686 A1 | 3/2012 | Bashani |
| 2012/0084210 A1 | 4/2012 | Farahmand |
| 2012/0092528 A1 | 4/2012 | Jung et al. |
| 2012/0143657 A1 | 6/2012 | Silberberg |
| 2012/0158466 A1 | 6/2012 | John |
| 2012/0173171 A1 | 7/2012 | Bajwa et al. |
| 2012/0185325 A1 | 7/2012 | Shani |
| 2012/0197806 A1 | 8/2012 | Hill |
| 2012/0208521 A1 | 8/2012 | Häger et al. |
| 2012/0213351 A1 | 8/2012 | Boyce et al. |

(56) References Cited

U.S. PATENT DOCUMENTS

| | | |
|---|---|---|
| 2012/0215375 A1 | 8/2012 | Chang |
| 2012/0222935 A1 | 9/2012 | MacKay et al. |
| 2012/0223841 A1 | 9/2012 | Chauvin et al. |
| 2012/0255333 A1 | 10/2012 | MacKay et al. |
| 2012/0273322 A1 | 11/2012 | MacKay et al. |
| 2012/0285790 A1 | 11/2012 | Jones et al. |
| 2012/0285791 A1 | 11/2012 | Jones et al. |
| 2012/0285792 A1 | 11/2012 | Jones et al. |
| 2012/0285793 A1 | 11/2012 | Jones et al. |
| 2012/0286036 A1 | 11/2012 | Jones et al. |
| 2012/0286968 A1 | 11/2012 | Jones et al. |
| 2012/0292385 A1 | 11/2012 | MacKay et al. |
| 2013/0005445 A1 | 1/2013 | Walker et al. |
| 2013/0016952 A1 | 1/2013 | Knuth |
| 2013/0021201 A1 | 1/2013 | Del Castillo et al. |
| 2013/0027218 A1 | 1/2013 | Schwarz et al. |
| 2013/0085928 A1 | 4/2013 | McKinney |
| 2013/0099943 A1 | 4/2013 | Subramanya |
| 2013/0116952 A1 | 5/2013 | Chai |
| 2013/0124270 A1 | 5/2013 | Tziperman et al. |
| 2013/0124320 A1 | 5/2013 | Karner |
| 2013/0143536 A1 | 6/2013 | Ratti |
| 2013/0231985 A1 | 9/2013 | MacKay et al. |
| 2013/0238406 A1 | 9/2013 | King et al. |
| 2013/0257589 A1 | 10/2013 | Mohiuddin et al. |
| 2013/0262275 A1 | 10/2013 | Outwater et al. |
| 2013/0285455 A1 | 10/2013 | Hunter et al. |
| 2014/0040028 A1 | 2/2014 | King et al. |
| 2014/0041301 A1 | 2/2014 | Oakely et al. |
| 2014/0058805 A1 | 2/2014 | Paesler et al. |
| 2014/0108107 A1 | 4/2014 | Jones et al. |
| 2014/0129158 A1 | 5/2014 | Shea |
| 2014/0139360 A1 | 5/2014 | Vilajosana Guillen et al. |
| 2014/0158767 A1 | 6/2014 | Ramaci |
| 2014/0165885 A1 | 6/2014 | Denny |
| 2014/0172518 A1 | 6/2014 | King et al. |
| 2014/0174880 A1 | 6/2014 | MacKay et al. |
| 2014/0174881 A1 | 6/2014 | King et al. |
| 2014/0210646 A1 | 7/2014 | Subramanya |
| 2014/0213176 A1 | 7/2014 | Mendelson |
| 2014/0214499 A1 | 7/2014 | Hudson et al. |
| 2014/0214500 A1 | 7/2014 | Hudson et al. |
| 2014/0218527 A1 | 8/2014 | Subramanya |
| 2014/0229246 A1 | 8/2014 | Ghaffari |
| 2014/0231505 A1 | 8/2014 | King et al. |
| 2014/0257943 A1 | 9/2014 | Nerayoff et al. |
| 2014/0279565 A1 | 9/2014 | Trump et al. |
| 2014/0289025 A1 | 9/2014 | King et al. |
| 2014/0319211 A1 | 10/2014 | MacKay et al. |
| 2014/0344891 A1 | 11/2014 | Mullick et al. |
| 2015/0000511 A1 | 1/2015 | Engl |
| 2015/0029041 A1 | 1/2015 | Liu et al. |
| 2015/0045984 A1 | 2/2015 | Hui et al. |
| 2015/0068827 A1 | 3/2015 | Makitalo et al. |
| 2015/0084786 A1 | 3/2015 | King et al. |
| 2015/0106172 A1 | 4/2015 | Salama |
| 2015/0120336 A1 | 4/2015 | Grokop et al. |
| 2015/0129391 A1 | 4/2015 | Jones et al. |
| 2015/0179070 A1 | 6/2015 | Sandbrook |
| 2015/0191178 A1 | 7/2015 | Roy et al. |
| 2015/0235503 A1 | 8/2015 | King et al. |
| 2015/0242605 A1 | 8/2015 | Du et al. |
| 2015/0278969 A1 | 10/2015 | Benoy et al. |
| 2015/0283902 A1 | 10/2015 | Tuukkanen |
| 2015/0288713 A1 | 10/2015 | Lawrence et al. |
| 2015/0294526 A1 | 10/2015 | Vogt |
| 2015/0302057 A1 | 10/2015 | Kealey et al. |
| 2015/0332587 A1 | 11/2015 | Schwarz et al. |
| 2015/0333598 A1 | 11/2015 | Conticchio et al. |
| 2015/0341241 A1 | 11/2015 | Robertson |
| 2015/0356604 A1 | 12/2015 | Kim et al. |
| 2015/0371483 A1 | 12/2015 | Sun |
| 2015/0376891 A1 | 12/2015 | Laurindo |
| 2016/0001782 A1 | 1/2016 | Fiedler |
| 2016/0012418 A1 | 1/2016 | MacKay et al. |
| 2016/0012602 A1 | 1/2016 | Xu et al. |
| 2016/0040699 A1 | 2/2016 | Nayar |
| 2016/0055322 A1 | 2/2016 | Thomas |
| 2016/0069557 A1 | 3/2016 | Rückgauer |
| 2016/0086397 A1 | 3/2016 | Phillips |
| 2016/0133085 A1 | 5/2016 | Eagon et al. |
| 2016/0163119 A1 | 6/2016 | Bashani |
| 2016/0267340 A1 | 9/2016 | Jensen |
| 2016/0268838 A1 | 9/2016 | Hunter et al. |
| 2016/0321714 A1 | 11/2016 | King et al. |
| 2016/0357991 A1* | 12/2016 | Hershman ............ G06F 13/4282 |
| 2016/0371915 A1 | 12/2016 | MacKay et al. |
| 2017/0032485 A1 | 2/2017 | Vemury |
| 2017/0032582 A1 | 2/2017 | Moran et al. |
| 2017/0034600 A1 | 2/2017 | King et al. |
| 2017/0083043 A1* | 3/2017 | Bowers ................ G06F 1/1601 |
| 2017/0094517 A1 | 3/2017 | Jakobsson |
| 2017/0096123 A1 | 4/2017 | Gennermann et al. |
| 2017/0098339 A1 | 4/2017 | Keller et al. |
| 2017/0116857 A1 | 4/2017 | Moran et al. |
| 2017/0148230 A1 | 5/2017 | Richard |
| 2017/0154368 A1 | 6/2017 | Jones et al. |
| 2017/0168155 A1 | 6/2017 | Richard |
| 2017/0186054 A1 | 6/2017 | Fish et al. |
| 2017/0193734 A1 | 7/2017 | King et al. |
| 2017/0197586 A1 | 7/2017 | Kawamura et al. |
| 2017/0206716 A1 | 7/2017 | King et al. |
| 2017/0256983 A1 | 9/2017 | Hunter et al. |
| 2017/0262882 A1 | 9/2017 | Shina |
| 2017/0299400 A1 | 10/2017 | Joung et al. |
| 2017/0320501 A1 | 11/2017 | Li et al. |
| 2017/0323227 A1 | 11/2017 | Sadeghi |
| 2017/0323513 A1 | 11/2017 | Jones et al. |
| 2017/0325082 A1 | 11/2017 | Rowe et al. |
| 2017/0369071 A1 | 12/2017 | Gould et al. |
| 2018/0018179 A1 | 1/2018 | Scheufler et al. |
| 2018/0025549 A1 | 1/2018 | King et al. |
| 2018/0025550 A1 | 1/2018 | Hudson et al. |
| 2018/0025629 A1 | 1/2018 | Schwarz et al. |
| 2018/0061172 A1 | 3/2018 | MacKay et al. |
| 2018/0068337 A1 | 3/2018 | Fiorucci et al. |
| 2018/0082488 A1 | 3/2018 | King et al. |
| 2018/0082489 A1 | 3/2018 | King et al. |
| 2018/0082490 A1 | 3/2018 | King et al. |
| 2018/0225908 A1 | 8/2018 | MacKay et al. |
| 2018/0225909 A1 | 8/2018 | MacKay et al. |
| 2018/0322534 A1 | 11/2018 | King et al. |
| 2018/0339708 A1 | 11/2018 | Geller |
| 2018/0342165 A1 | 11/2018 | Sweeney et al. |
| 2018/0350185 A1 | 12/2018 | King et al. |
| 2019/0066424 A1 | 2/2019 | Hassani et al. |
| 2019/0114869 A1 | 4/2019 | MacKay et al. |
| 2019/0131819 A1 | 5/2019 | Bell |
| 2019/0220011 A1 | 7/2019 | Della Penna |
| 2019/0227954 A1 | 7/2019 | Shi |
| 2019/0236940 A1 | 8/2019 | Schwarz et al. |
| 2019/0251608 A1 | 8/2019 | King et al. |
| 2019/0272680 A1 | 9/2019 | King et al. |
| 2019/0272681 A1 | 9/2019 | King et al. |
| 2019/0304203 A1 | 10/2019 | King et al. |
| 2019/0362383 A1 | 11/2019 | King et al. |
| 2019/0370923 A1 | 12/2019 | Randall et al. |
| 2019/0378368 A1 | 12/2019 | MacKay et al. |
| 2019/0385454 A1 | 12/2019 | King et al. |
| 2020/0127801 A1 | 4/2020 | Sengupta et al. |
| 2020/0136229 A1 | 4/2020 | MacKay et al. |
| 2020/0153270 A1 | 5/2020 | Hunter et al. |
| 2020/0160263 A1 | 5/2020 | Kuettner |
| 2020/0276503 A1 | 9/2020 | Marchiorello |
| 2020/0310528 A1 | 10/2020 | Upmanue et al. |
| 2020/0334581 A1 | 10/2020 | Skaling |
| 2020/0349666 A1 | 11/2020 | Hodge et al. |
| 2020/0364967 A1 | 11/2020 | Spice |
| 2021/0065263 A1 | 3/2021 | King et al. |
| 2021/0067846 A1 | 3/2021 | King et al. |
| 2021/0319485 A1 | 10/2021 | King et al. |
| 2021/0344218 A1 | 11/2021 | Hunter et al. |
| 2021/0407348 A1 | 12/2021 | King et al. |
| 2022/0030335 A1 | 1/2022 | King et al. |

(56) References Cited

U.S. PATENT DOCUMENTS

2022/0076303 A1 3/2022 King et al.
2022/0076304 A1 3/2022 King et al.
2022/0076305 A1 3/2022 King et al.

FOREIGN PATENT DOCUMENTS

| | | |
|---|---|---|
| AU | 200227724 A1 | 1/2003 |
| AU | 2006203554 A1 | 9/2006 |
| AU | 314132 | 5/2007 |
| AU | 315845 | 8/2007 |
| AU | 315846 | 8/2007 |
| AU | 315847 | 8/2007 |
| CA | 2186406 | 3/1996 |
| CA | 2233931 A1 | 4/1997 |
| CA | 2248347 C | 10/1997 |
| CA | 2448347 C | 10/1997 |
| CA | 2511461 C | 10/1997 |
| CA | 2260925 A1 | 1/1998 |
| CA | 2186406 | 3/1998 |
| CA | 2227833 C | 7/1998 |
| CA | 2346908 A1 | 4/2000 |
| CA | 2302922 C | 9/2000 |
| CA | 2352968 A1 | 4/2001 |
| CA | 2373400 A1 | 8/2001 |
| CA | 2401429 A1 | 9/2001 |
| CA | 2377010 A1 | 10/2001 |
| CA | 2357179 A1 | 3/2002 |
| CA | 2437722 A1 | 8/2002 |
| CA | 2387540 C | 11/2002 |
| CA | 2453369 A1 | 1/2003 |
| CA | 2363915 | 5/2003 |
| CA | 2363915 A1 | 5/2003 |
| CA | 2413198 A1 | 5/2003 |
| CA | 2414132 A1 | 6/2003 |
| CA | 2387540 | 11/2003 |
| CA | 2453369 | 1/2004 |
| CA | 2443677 C | 3/2004 |
| CA | 2517717 | 9/2004 |
| CA | 2595309 A1 | 7/2006 |
| CA | 2631699 A1 | 6/2007 |
| CA | 2622164 C | 8/2008 |
| CA | 122930 | 9/2008 |
| CA | 126745 | 9/2008 |
| CA | 2693911 A1 | 1/2009 |
| CA | 2650192 A1 | 7/2009 |
| CA | 2650195 A1 | 7/2009 |
| CA | 2650195 C | 7/2009 |
| CA | 2933066 A1 | 7/2009 |
| CA | 2745368 C | 7/2010 |
| CA | 134041 | 9/2010 |
| CA | 134042 | 9/2010 |
| CA | 2773132 C | 3/2011 |
| CA | 2773135 A1 | 3/2011 |
| CA | 2874155 | 3/2012 |
| CA | 2770093 A1 | 5/2012 |
| CA | 2870544 C | 5/2012 |
| CA | 2870592 A1 | 5/2012 |
| CA | 2773250 C | 9/2012 |
| CA | 155382 | 5/2015 |
| CA | 155383 | 5/2015 |
| CA | 155391 | 5/2015 |
| CA | 156990 | 5/2015 |
| CA | 156991 | 5/2015 |
| CA | 156992 | 5/2015 |
| CA | 156993 | 5/2015 |
| CA | 156994 | 5/2015 |
| CA | 156995 | 5/2015 |
| CA | 157067 | 5/2015 |
| CA | 157068 | 5/2015 |
| CA | 157069 | 5/2015 |
| CA | 161049 | 10/2015 |
| CA | 160598 | 2/2016 |
| CA | 163369 | 2/2016 |
| CA | 163370 | 2/2016 |
| CA | 2900177 A1 | 2/2017 |
| CA | 2908793 A1 | 2/2017 |
| CA | 2932667 A1 | 2/2017 |
| CA | 168171 | 3/2017 |
| CA | 168172 | 3/2017 |
| CA | 168173 | 3/2017 |
| CA | 168198 | 3/2017 |
| CA | 168199 | 3/2017 |
| CA | 168200 | 3/2017 |
| CA | 171649 | 11/2017 |
| CA | 171650 | 11/2017 |
| CA | 171651 | 11/2017 |
| CA | 171652 | 11/2017 |
| CA | 171653 | 11/2017 |
| CA | 171654 | 11/2017 |
| CA | 3046774 | 12/2019 |
| CA | D189362 | 6/2021 |
| CA | D189363 | 6/2021 |
| CA | D189364 | 6/2021 |
| CA | D189365 | 6/2021 |
| CA | D189366 | 6/2021 |
| CN | 1037604 A | 11/1989 |
| CN | 2395344 Y | 9/2000 |
| CN | 2470887 Y | 1/2002 |
| CN | 2544352 Y | 4/2003 |
| CN | 1549990 A | 11/2004 |
| CN | 201303054 Y | 9/2009 |
| DE | 2804085 A1 | 8/1978 |
| DE | 2750193 A1 | 5/1979 |
| DE | 102005041290 A1 | 3/2007 |
| EP | 0265328 A1 | 4/1988 |
| EP | 0329129 A3 | 8/1989 |
| EP | 0933288 A2 | 4/1999 |
| EP | 0933288 A2 | 8/1999 |
| EP | 0980055 A1 | 2/2000 |
| EP | 1227448 | 7/2002 |
| EP | 1327962 A2 | 7/2003 |
| EP | 1376491 A1 | 2/2004 |
| EP | 1748393 A1 | 1/2007 |
| EP | 1128350 B1 | 10/2007 |
| EP | 1898360 A1 | 3/2008 |
| EP | 2215605 B1 | 8/2012 |
| EP | 1898360 | 2/2013 |
| EP | 002416206-0001 A1 | 3/2014 |
| EP | 002416206-0002 A1 | 3/2014 |
| EP | 002516206-0003 A1 | 3/2014 |
| EP | 002479352-0001 A1 | 6/2014 |
| EP | 002479352-0002 A1 | 6/2014 |
| EP | 002479352-0003 A1 | 6/2014 |
| EP | 002479360-0001 A1 | 6/2014 |
| EP | 002479360-0002 A1 | 6/2014 |
| EP | 002479360-0003 A1 | 6/2014 |
| EP | 002479428-0001 A1 | 6/2014 |
| EP | 002479428-0002 A1 | 6/2014 |
| EP | 002479428-0003 A1 | 6/2014 |
| EP | 003076702-0001 A1 | 4/2016 |
| EP | 003076702-0002 A1 | 4/2016 |
| EP | 003076702-0003 A1 | 4/2016 |
| EP | 003076702-0004 A1 | 4/2016 |
| EP | 003076702-0005 A1 | 4/2016 |
| EP | 003076702-0006 A1 | 4/2016 |
| EP | 003462183-0001 A1 | 11/2016 |
| EP | 003462183-0002 A1 | 11/2016 |
| EP | 003462183-0003 A1 | 11/2016 |
| EP | 003462183-0004 A1 | 11/2016 |
| EP | 003462183-0005 A1 | 11/2016 |
| EP | 003462183-0006 A1 | 11/2016 |
| EP | 004415164-0001 | 10/2017 |
| EP | 004415164-0002 | 10/2017 |
| EP | 004415164-0003 | 10/2017 |
| EP | 004415164-0004 | 10/2017 |
| EP | 004415164-0005 | 10/2017 |
| EP | 004415164-0006 | 10/2017 |
| EP | 006836128-0001 | 9/2019 |
| EP | 006836128-0002 | 9/2019 |
| EP | 006836128-0003 | 9/2019 |
| EP | 006836128-0004 | 9/2019 |
| EP | 006836128-0005 | 9/2019 |
| EP | 006836128-0006 | 9/2019 |
| EP | 006836128-0007 | 9/2019 |

(56) References Cited

FOREIGN PATENT DOCUMENTS

| | | |
|---|---|---|
| EP | 006836128-0008 | 9/2019 |
| EP | 006836128-0009 | 9/2019 |
| EP | 3582195 | 12/2019 |
| FR | 2600448 A1 | 12/1987 |
| FR | 2837583 A1 | 9/2003 |
| FR | 2928678 | 9/2009 |
| FR | 2979726 | 3/2013 |
| GB | 1237579 | 6/1971 |
| GB | 1283555 | 7/1972 |
| GB | 1431862 | 4/1976 |
| GB | 2077475 A | 12/1981 |
| GB | 2155228 | 9/1985 |
| GB | 2155228 A | 9/1985 |
| GB | 2284919 A | 6/1995 |
| GB | 2298510 A | 9/1996 |
| GB | 2461397 | 6/2010 |
| IL | 149880 A | 6/2007 |
| JP | 58121494 A | 7/1983 |
| JP | 6437661 | 2/1989 |
| JP | S6437661 A | 2/1989 |
| JP | H01165494 | 6/1989 |
| JP | H01303026 | 12/1989 |
| JP | H028692 A | 1/1990 |
| JP | H0261711 A | 3/1990 |
| JP | H02180623 A | 7/1990 |
| JP | H03253992 | 11/1991 |
| JP | H0487533 A | 3/1992 |
| JP | 08305998 A | 11/1996 |
| JP | 2002042181 | 2/2002 |
| JP | 2002074430 A | 3/2002 |
| JP | 2002099640 A | 4/2002 |
| JP | 2002528799 A | 9/2002 |
| JP | 3441832 | 9/2003 |
| JP | 2003527701 A | 9/2003 |
| JP | 2005242888 A | 9/2005 |
| JP | 2005267430 A | 9/2005 |
| JP | 2007052773 A | 3/2007 |
| JP | 4247079 | 4/2009 |
| JP | 2011060206 A | 3/2011 |
| JP | 5238316 | 7/2013 |
| JP | 5259000 B1 | 8/2013 |
| KR | 20000016671 A | 3/2000 |
| KR | 20000030290 | 6/2000 |
| KR | 20010028481 A | 4/2001 |
| KR | 102005038077 A | 4/2005 |
| KR | 20060088085 | 8/2006 |
| KR | 100693204 B1 | 3/2007 |
| KR | 1020080026282 A | 3/2008 |
| KR | 20080041730 A | 5/2008 |
| MX | 2008007047 A | 8/2008 |
| NZ | 530606 | 11/2006 |
| NZ | 20020530606 A | 11/2006 |
| WO | 198100778 A1 | 3/1981 |
| WO | 1995020204 | 7/1995 |
| WO | 199611453 A1 | 4/1996 |
| WO | 199712345 A1 | 4/1997 |
| WO | 1997033341 A1 | 9/1997 |
| WO | 199737328 A1 | 10/1997 |
| WO | 199804080 A1 | 1/1998 |
| WO | 200059201 A1 | 10/2000 |
| WO | 2000059201 | 10/2000 |
| WO | 200124127 A1 | 4/2001 |
| WO | WO2001024127 A1 | 4/2001 |
| WO | 200169541 A1 | 9/2001 |
| WO | 200180157 A1 | 10/2001 |
| WO | 2002063570 A2 | 8/2002 |
| WO | 2002084600 | 10/2002 |
| WO | 2003005324 A1 | 1/2003 |
| WO | 2003009238 | 1/2003 |
| WO | 2003009238 A1 | 1/2003 |
| WO | 2003065322 | 8/2003 |
| WO | 2004012352 A1 | 2/2004 |
| WO | 2005027035 A1 | 3/2005 |
| WO | 2005031494 A2 | 4/2005 |
| WO | 2006076773 A1 | 7/2006 |
| WO | 2006095352 A2 | 9/2006 |
| WO | 2007063530 | 6/2007 |
| WO | 2009009854 A1 | 1/2009 |
| WO | 2009154787 A2 | 12/2009 |
| WO | 2010008610 A2 | 1/2010 |
| WO | 2010062105 | 6/2010 |
| WO | 2010071974 A1 | 7/2010 |
| WO | 2011029061 A2 | 3/2011 |
| WO | 2011029062 A2 | 3/2011 |
| WO | 2012015453 A1 | 2/2012 |
| WO | 2012092609 A2 | 7/2012 |
| WO | 2012154902 A1 | 11/2012 |
| WO | 2012154913 A2 | 11/2012 |
| WO | 2013016453 A2 | 1/2013 |
| WO | 2013019273 | 2/2013 |
| WO | 2013049418 A2 | 4/2013 |
| WO | 2014014494 A1 | 1/2014 |
| WO | 2014127384 | 8/2014 |
| WO | 2014127384 A1 | 8/2014 |
| WO | 201152369 A3 | 9/2014 |
| WO | 2017024396 A1 | 2/2017 |
| WO | 2017024397 A1 | 2/2017 |
| WO | WO2017024396 A1 | 2/2017 |
| WO | WO2017024397 A1 | 2/2017 |

OTHER PUBLICATIONS

Duncan Solutions—VM Pay-by-Spcae Multi-Space Meter brochure, 2013 (2 pages).
Duncan, Duncan VM—Solar Power meter photograph, pre-Mar. 2011 (1 page).
Duncan Solutions, Duncan VS, 2006 (2 pages).
McCullagh, D., "Hackers: We can bypass San Francisco e-parking meters," Jul. 30, 2009, http://news.cnet.com (2 pages).
Exhibit 1003—Declaration of Todd Magness in Support of Petition for Inter Partes Review of U.S. Pat. No. 7,854,310, dated Oct. 21, 2015 (70 pages).
Exhibit 1004—Declaration of Anderson Moore in Support of Petition for Inter Partes Review of U.S. Pat. No. 8,595,054, dated Oct. 21, 2015 (19 pages).
Exhibit 1005—U.S. Appl. No. 60/741,920, filed Dec. 2, 2005 (20 pages).
Exhibit 1009—Tung, Y., "Design of an Advanced On-street Parking Meter," Thesis, Rochester Institute of Technology, 2001 (75 pages).
Exhibit 1010—Christian, S. E., "Parking Meter Winding Up for Computer Age," Chicago Tribune, May 19, 1995 (6 pages).
Exhibit 1011—Associated Press, "New parking meters based on computer," The San Diego Union, Feb. 1, 1987 (1 page).
Exhibit 1012—Lunden, J., Good Morning America transcript, Nov. 6, 1986 (3 pages).
Exhibit 1013—LUKE Parking Station ad (p. 28), Parking Today, vol. 10, No. 4, Apr. 2005 (64 pages)—Part 1.
Exhibit 1014—Blass, E., "Changing times," Lansing State Journal, Feb. 19, 1987 (1 page).
Exhibit 1015—Gabriele, M.C., "Electronic Parking Meters Rival Mechanical Units," American Metal Market/Metalworking News, Sep. 29, 1986 (1 page).
Exhibit 1016—Sandler, L., "Lovely VISA, meter maid: Use credit card to park," Milwaukee Journal Sentinel, Jun. 13, 2005 (1 page).
Exhibit 1017—Item for Finance Commitee, "Capital Works Reserve Fund, Head 708—Capital Subventions and Major Systems and Equipment," FCR(2002-03)18, May 24, 2002 (15 pages).
Exhibit 1018—Anonymous, "Happy %#@! Anniversary, First Parking Meter Installed Jul. 16, 1935," The Expired Meter News, Views, Information on Driving in Chicago, Jul. 16, 2009 (10 pages).
Exhibit 1019—Anonymous, "Parking Meter Patented 72 Years Ago Today", The Expired Meter News, Views Information on Driving in Chicago, May 24, 2010 (6 pages).
Exhibit 1032—U.S. Pat. No. 5,570,771 to Jacobs, Nov. 5, 1996 (29 pages).
Exhibit 1034—Anonymous, "Smart Cards and Parking," TC-06001, Smart Card Alliance Transportation Council White Paper, Jan. 2006 (52 pages).

(56) References Cited

OTHER PUBLICATIONS

Exhibit 1037—Catalog Entry for Exhibit 1009, Tung, Y., "Design of an advanced on-street parking meter," Oct. 18, 2015 (2 pages).
Exhibit 1038—POM Parking Meters website, Oct. 20, 2015 (4 pages).
IPS Group Inc., Exhibit 2001, Design of an advanced on-street parking meter, Jan. 12, 2016 (2 pages).
IPS Group Inc., Exhibit 2002, About RIT Digital Media Library, Jan. 12, 2016 (1 page).
IPS Group Inc., Exhibit 2003, The U.S. Conference of Mayors Presents 'Best-Practice' Awards, Jan. 20, 2012 (2 pages).
IPS Group Inc., Exhibit 2004, City of Los Angeles, Card & Coin Parking Meter Lease, Nov. 29, 2010 (4 pages).
IPS Group Inc., Exhibit 2005, City of Culver City, California, Approval of a Contract with IPS Group Inc., for the Sole-Source Purchase of 1,000 Parking Meters, Dec. 12, 2011 (3 pages).
IPS Group Inc., Exhibit 2006, City of San Luis Obispo City Manager Report, Award of Credit Card Meters and Service Contract, RFP Specification No. 91137, Jan. 20, 2012 (5 pages).
IPS Group Inc., Exhibit 2007, Walnut Creek, Alternate Downtown Parking Pay Technology, Oct. 20, 2011 (4 pages).
IPS Group Inc., Exhibit 2008, How M2M Maximizes Denver's Revenue, Oct. 2011 (4 pages).
IPS Group Inc., Exhibit 2009, Somerville, MA, T&P Introduces User-Friendly Parking Meters & Service Upgrades with Electronic Meter Pilot, Apr. 19, 2011 (2 pages).
Fidelman, C., "Time's running out for parking meters at present locations: $270,000 cited as replacement cost. City employees who ticket motorists find electronic meters unsuitable," The Gazette, Final Edition, Montreal, Quebec, Canada, Nov. 12, 2002, p. A7 (2 pages).
Flatley, J., "In San Francisco, hackers park for free," posted Jul. 31, 2009, www.engadget.com (1 page).
Digital Payment Technologies, Response to Request for Proposal for Multi-Space Parking Meters, City of Fort Lauderdale, Jan. 13, 2010 (89 pages).
Howland, S., "How M2M Maximizes Denver's Revenue," FieldTechnologiesOnline.com, Oct. 2011, pp. 9-12 (4 pages).
MAX Dual Space Meter advertisement, Jun. 25, 2015 (2 pages).
IPS Multi Bay Parking Meter product description, http://www.design-industry.com.au/work/multi-bay-parking-meter/, Oct. 6, 2015 (6 pages).
Reino Parking Systems: On-Street Service Procedures, Jun. 29, 2004 (19 pages).
Reino Meter Advertisement, The power of a paystation, Parking Today, Aug. 2003 (1 page).
Duncan Solutions/Reino, RSV3 Digital Parking Meter, Jul. 5, 2011 (2 pages).
Reino, RSV3 brochure, Nov. 10, 2007 (4 pages).
Digital Payment Technologies, Sierra Wireless Case Study, Dec. 7, 2009 (2 pages).
IPS Single Bay Parking Meter product description, http://www.design-industry.com.au/work/ips-single-parking-meter/, Oct. 6, 2015 (6 pages).
StreetSmart Technology, LLC, "Technical Specifications and System Features for the StreetSmart Solution" Brochure, May 2011 (8 pages).
Digital Payment Technologies, Digital Payment Technologies and PXT Payments Forge Partnership To Bring Cities Smart Parking Meters and Merchant Loyalty Debit Cards, www.digitalpaytech.com, Apr. 27, 2010 (2 pages).
(Cell Net Data Systems) "First Wireless Monitoring of Parking Meters Results in Theft Arrests Using CellNet Data Systems Technology," PRNewswire, May 11, 1999 (3 pages).
Basu et al., "Networked Parking Spaces: Architecture and Appliances," MCL Technical Report No. 07-01-2002, Proc. IEEE Vehicular Transportation Conference, Vancouver, Canada, Sep. 2002 (10 pages).
Burden et al., "Near Field Communications (NFC) in Public Transport," Digital Identity Forum, 2006 (18 pages).

Exhibit 1013—LUKE Parking Station ad (p. 28), Parking Today, vol. 10, No. 4, Apr. 2005 (64 pages)—Part 2.
MacKay Custodian TM Multi-Space Machine Configuration Guide, 2003-2005 (184 pages).
Reino International, Recommended Cashbox Handling Guidelines, Version 2.0, Nov. 26, 2003 (7 pages).
Digital Payment Technologies, Credit Card Processing with LUKE and SHELBY, Dec. 2007 (15 pages).
Duncan Solutions—Intermec CN50 webpage, Mar. 8, 2011 (2 pages).
Duncan Solutions—Motorola MC75 webpage, Mar. 8, 2011 (2 pages).
Duncan Solutions—AutoCITE brochure, 2013 (2 pages).
Duncan Solutions—AutoCITE TM X3 Handheld Computer, 2013 (2 pages).
Ambravan, B., "Improved-Clarity Polycarbonate (PC) Resins used in liniLED PU," http://organiclighting.com/tag/polycarbonate-pc-resins/, Sep. 26, 2016 (1 page).
Intrinsyc Software International, Inc., Intrinsyc and Digital Pioneer Partner on Development of New Leading Edge Parking Terminal Solution, Aug. 14, 2003 (2 pages).
Shaheen, S., "Smart Parking Management Field Test: A Bay Area Rapid Transit (BART) District Parking Demonstration," Institute of Transportation Studies, UC Davis, Jan. 1, 2005 (139 pages).
Micrel, Application Note 51 Frequency Hopping Techniques, Jun. 2006, Rev. 1.0 (8 pages).
Cardinal Tracking Inc.⇒MobileCite brochure, dated prior to Jun. 15, 2015 (2 pages).
The United States Conference of Mayors Press Release, "The U.S. Conference of Mayors Presents 'Best-Practice' Awards," Jan. 20, 2012 (3 pages).
Reino, Operator User Manual, 2003 (106 pages).
Remedios et al., "NFC Technologies in Mobile Phones and Emerging Applications," 2006, IFIP International Federation for Information Processing, vol. 220, Information Technology for Balanced Manufacturing Systems, ed. Shen, W., (Boston: Springer, pp. 425-434 (10 pages).
Reino, Parking Systems RSV2 Service Manual, Version 3.1, Dec. 2003 (78 pages).
Duncan Solutions, Pay-by-Space Parking Meters, Customer Support Manual, Jul. 2006 (216 pages).
Bayless et al., "Smart Parking and the Connected Consumer," ITS America Research, Dec. 2012 (39 pages).
Bernspang, F., "Smart Parking using Magnetometers and Mobile Applications," Master's Thesis, Master of Science in Engineering Technology, Computer Science and Engineering, Lulea University of Technology, Nov. 2010-May 2011 (35 pages).
Cosgrove, D., "SmartPark," Senior Project Report, Jun. 12, 2013 (20 pages).
Spyker, R. L., "Predicting capacitor run time for a battery/capacitor hybrid source," Power Electronic Drives and Energy Systems for Industrial Growth, 1998, abstract only (2 pages).
Video link, "PhotoViolationHandHeldUnit TM" https://web.archive.org/web/20080222104246/http://www.photoviolation.com/videos/HHU.wmv, Photo Violation Technologies Corp., dated prior to Jun. 15, 2015.
Video link, "The PBS Solution" https://web.archive.org/web/20080222104246/http://www.photoviolation.com/videos/PBS.wmv, Photo Violation Technologies Corp., dated prior to Jun. 15, 2015.
Video link, "The PVM Solution" https://web.archive.org/web/20080222104246/http://www.photoviolation.com/videos/PVM.wmv, Photo Violation Technologies Corp., dated prior to Jun. 15, 2015.
Video link, "Park Card Meter TM System," https://web.archive.org/web/20080222104246/http://www.photoviolation.com/videos/PCM.wmv, Photo Violation Technologies Corp., dated prior to Jun. 15, 2015.
Byrd Dennis, Parking Meter Manufacturer Sees Bright Future for New Sun-Powered Devices, Los Angeles Times, May 14, 1989 (2 pages).
AU315846—Figures.
AU315847—Figures.

(56) References Cited

OTHER PUBLICATIONS

AU315845—Figures.
AU314132—Figures.
The United States Conference of Mayors Pres Release, "The U.S. Conference of Mayors Presents 'Best-Practice Awards'", Jan. 20,. 2012 (3 pgs).
Duncan Solutions, Single-Space Meters Brochure, www.duncansolutions.com, 2006 (2 pgs).
Kienzle, meter photograph, pre-Mar. 2011.
Duncan Solutions, AutoTrax Meter Management System Brochure, May 2010 (2 pgs).
Barefoot, D., "There'll be lies, there'll be tears, a jury of your peers", DarrenBarefoot.com, Dec. 2005, pp. 8-9(39 ogs).
Duncan Solutions, AutoCite X3 Handheld Computer brochure , 2013 (2 pgs).
Schuering, K., "Weatherable PC Applications Expand", www.plasticstoday.com, Sep. 26, 2016 (2 pgs).
Byrd, Dennis, "City officials plug solar-powered parking meters. Electronic eye ends free parking," Lawrence Journal World, Apr. 30, 1989, p. 11C (1 Page).
Anonymous, "The Originators of Metered Parking, Series II, APM-E Mechanism, Service Manual," POM Incorporated, May 23, 2006 revision (22 pages).
POM APM Solar Powered Meter advertisements, dated Apr. 28, 2010 (5 pages).
CWT MAX Single/Dual Space Meter, Technical Data, May 18, 2016 (4 pages).
Digital Payment Technologies—LUKE brochure, dated prior to Jun. 15, 2015 (4 pages).
Digital Payment Technologies, Request for Proposal #509030—Parking Pay Stations, City of Dover, New Hampshire, Oct. 22, 2008 (part 1; 110 pages).
Digital Payment Technologies, Request for Proposal #509030—Parking Pay Stations, City of Dover, New Hampshire, Oct. 22, 2008 (part 2; 160 pages).
Digital Payment Technologies, Technologies Launches Luke II Multi-Space Parking Pay Station, May 16, 2011 (3 pages).
Digital Payment Technologies—LUKE website, https://web.archive.org/web/20061025094839/http:www.digitalpaytech.com/luke.html, Oct. 25, 2006 (5 pages).
Duncan Solutions—Eagle CK brochure, 2013 (2 pages).
Transcript & Screenshots of https://web.archive.org/web/20080222104246/http://www.photoviolation.com/videos/PCM.wmv, Photo Violation Technologies Corp.—"ParkCardMeter TM System," dated prior to Jun. 15, 2015 (6 pages).
Duncan Solutions—Eagle 2100 brochure, 2013 (2 pages).
On-street Parking Automatic Toll Collector System Proposal For Jinan City dated May 2005 (41 pages).
DAT Self-service System Limited, User Manual for DAT Focus Meter, Version 1.0, Date: May 2005, pp. 1-39 (39 pages) (no translation).
Photo Violation Technologies—Revolutionizing the Industry by Perfecting How People Park, https://web.archive.org/web/20060813094459/http://photoviolation.com/, Aug. 13, 2006 (65 pages).
Photo Violation Technologies—Revolutionizing the Industry by Perfecting How People Park, https://web.archive.org/web/20060823100739/http://photoviolation.com/, Aug. 23, 2006 (68 pages).
Photo Violation Technologies—Revolutionizing the Industry by Perfecting How People Park, https://web.archive.org/web/20080222104246/http://photoviolation com/, Feb. 22, 2008 (47 pages).
Photo Violation Technologies—Revolutionizing the Industry by Perfecting How People Park, https://web.archive.org/web/20060110041849/http://photoviolation.com/, Jan. 10, 2006 (57 pages).
Photo Violation Technologies—Revolutionizing the Industry by Perfecting How People Park, https://web.archive.org/web/20060715195511/http://photoviolation.com/, Jul. 15, 2006 (49 pages).
Photo Violation Technologies—Revolutionizing the Industry by Perfecting How People Park, https://web.archive.org/web/20070628195927/http://photoviolation.com/, Jun. 28, 2007 (49 pages).
Photo Violation Technologies Corp., https://web.archive.org/web/20040401225217/http://photoviolation.com/, Apr. 1, 2004 (50 pages).
Photo Violation Technologies Corp., https://web.archive.org/web/20131118213440/http://photoviolation.com/, Nov. 18, 2013 (8 pages).
YouTube video, "The PhotoViolationMeter TM" https://www.youtube.com/watch?v=YEFuebnwn_Y, Dec. 15, 2006 (2 pages).
Bridge IR Group, Inc., Changing the Way the World Pays for On-Street Parking, Research Report, United States-Technology Processing Systems/Products, Dec. 6, 2006 (23 pages).
Barefoot, D., "There'll be lies, there'll be tears, a jury of your peers," DarrenBarefoot.com: Dec. 2005, pp. 8-9 (39 pages).
Photo Violation Technologies Corp.—Products, Oct. 2, 2015 (3 pages).
Photo Violation Technologies Corp. Press Releases, Jul. 18, 2005—Jan. 17, 2006 (9 pages).
The Patented PhotoViolationMeter Solution book view, dated Mar. 28, 2006 (12 pages).
PhotoViolationMeter pamphlet, dated Jan. 18, 2006 (2 pages).
The PhotoViolationMeter Case Study, Photo Violation Technologies Corp., Dec. 15, 2015 (4 pages).
Transcript & Screenshots of https://web.archive.org/web/20080222104246/http://www.photoviolation.com/videos/HHU.wmv, Photo Violation Technologies Corp.—"PhotoViolationHandHeldUnitTM," dated prior to Jun. 15, 2015 (7 pages).
Transcript & Screenshots of https://web.archive.org/web/20080222104246/http://www.photoviolation.com/videos/PBS.wmv, Photo Violation Technologies Corp.—"The PBS Solution," dated prior to Jun. 15, 2015 (10 pages).
Transcript & Screenshots of https://web.archive.org/web/20080222104246/http://www.photoviolation.com/videos/PVM.wmv, Photo Violation Technologies Corp.—"The PVM Solution," dated prior to Jun. 15, 2015 (17 pages).
POM_APM_Photo_IMG_20120423_00351.
POM_APM_Photo_IMG_20120423_00350.
POM_APM_Photo_IMG_20120423_00348.
POM_APM_Photo_IMG_20120423_00346.
POM_APM_Photo_IMG_20120423_00344.
POM_APM_Photo_IMG_20120423_00342.
POM_APM_Photo_IMG_20120423_00341.
POM_APM_Photo_IMG_20120423_00340.
POM_APM_Photo_IMG_20120423_00339.
POM_APM_Photo_IMG_20120423_00338.
POM_APML_Photo_IMG_20120423_00337.
POM_APM_Photo_IMG_20120423_00336.
POM_APM_Photo_DSC06395.
POM_APM_Photo_4Xfront.
POM_APM_Photo_10_03_11_1537.
POM_APM_Photo_10_03_11_1538.
POM_APM_Photo_10_03_11_1539.
POM_APM_Photo_apm2xcrop.
POM_APM_Photo_apm2xyellow.
POM_APM_Photo_DSC06379.
POM_APM_Photo_DSC06380.
POM_APM_Photo_DSC06381.
POM_APM_Photo_DSC06382.
POM_APM_Photo_DSC06383.
POM_APM_Photo_DSC06384.
POM_APM_Photo_DSC06385.
POM_APM_Photo_DSC06386.
POM_APM_Photo_DSC06387.
POM_APM_Photo_DSC06389.
POM_APM_Photo_DSC06390.
POM_APM_Photo_DSC06391.
POM_APM_Photo_DSC06393.
POM_APM_Photo_DSC06394.
"Happy Anniversary, First Parking Meter Installed Jul. 16, 1935", TheExpiredMeter.com, Jul. 16, 2009, 10pgs.
"An Excerise in Changing the Business: Advertising Vending Machines", Jim Bonfield, www.adweek.com/agencyspy, Feb. 7, 2008, 4 pgs.

(56) References Cited

OTHER PUBLICATIONS

Duncan Solutions Brochure, "Single-Space Meters: Smart technology for true system integration and intelligent parking management", www.duncansolutions.com, Apr. 2006, 2 pgs.

"Technology breakthrough counters abuse of disabled parking", Scoop Media, Press Release: Car Parking Technology, New Zealand, Dec. 7, 2011, 1 pg.

"The PhotoViolation Meter TM", YouTube Video, https://www.youtube.com/watch?v=YEFuebnwn_Y, Dec. 15, 2006.

Digital Payment Technologies, "Technologies Launches Luke II Multi-Space Parking Pay Station", Source: Marketwire News Releases, May 16, 2011 (3 pgs).

SEDADI_Card_and_Coin_Meter_Lease_City_of_LA_Nov_29_2010_4pgs.

No_change_for_car_park_charge_Just_RingGo_July_6_2017.

Parking_Pay_Stations_Cocoa_Beach_FL_Official_Website.

EBAY_listing_AMANO_MCGANN_MSM_METRIC_ELITE_LS_SOLAR_2022.

Nebraska_Innovation_Campus_Additional_way_to_pay_metered_street_parking_at_NIC_2022.

\* cited by examiner

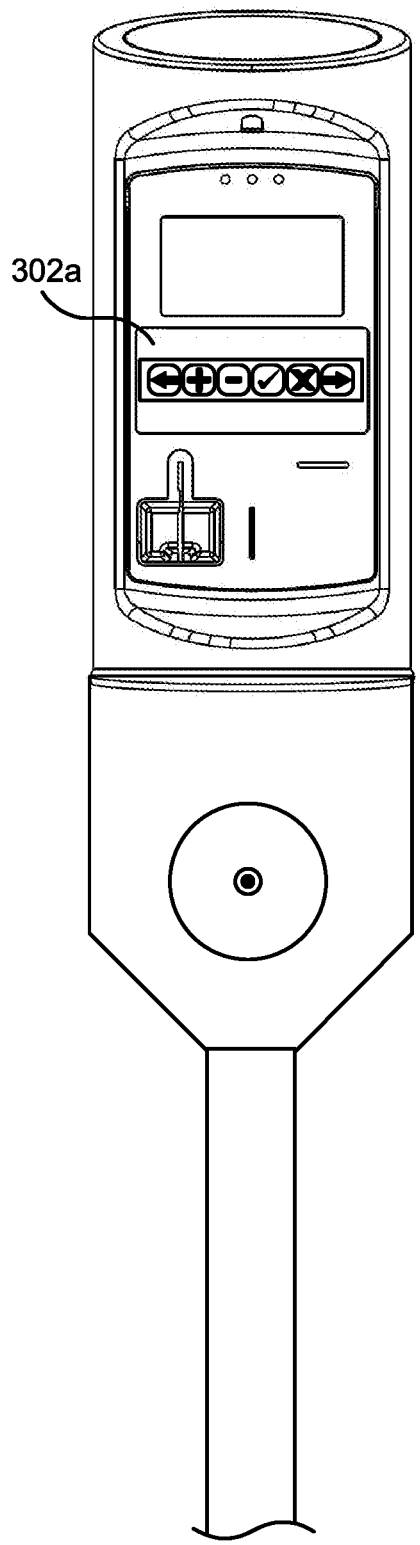
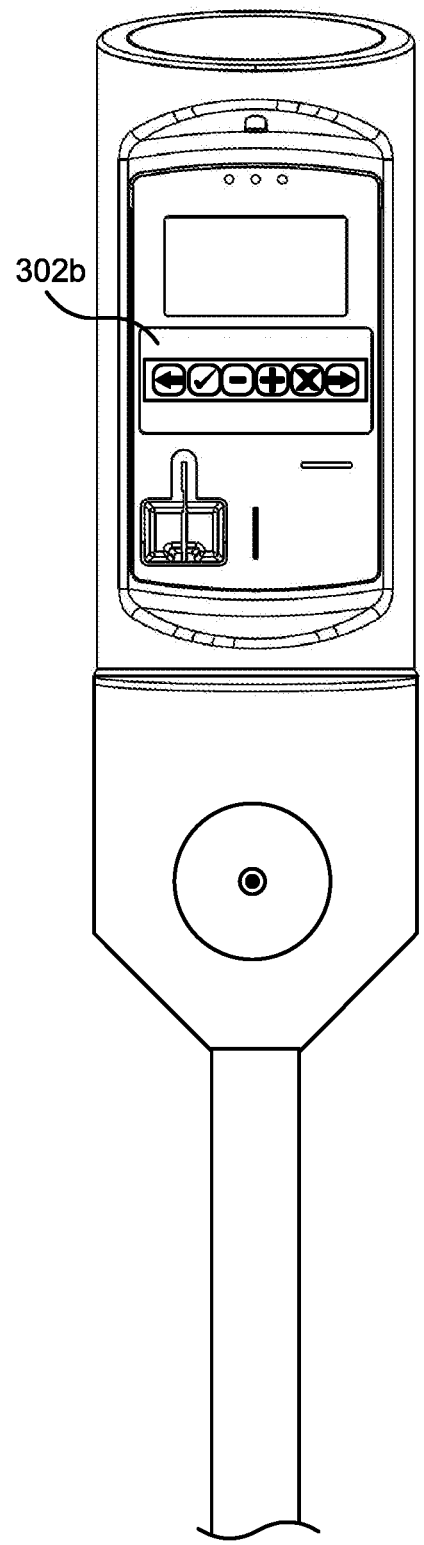
FIG. 3A
FIG. 3B

SPI KEYBOARD MODULE FOR A PARKING METER AND A PARKING METER HAVING AN SPI KEYBOARD MODULE

TECHNICAL FIELD

The current disclosure relates to parking meters and in particular to parking meters incorporating keyboards.

BACKGROUND

Parking meters can be classified as either a multi-space meter or a single space meter. Multi-space meters are generally larger and are used to manage payment for park time at a large group of parking spaces such as a parking lot or street block. Multi space meters tend to have sufficient space to include larger cash vaults, large batteries as well as large solar panels. Alternatively, Multi-space meters may be connected to an electrical grid. Single space meters are generally smaller meters, typically found at on street parking spots. Single space parking meters tend to be significantly smaller than multi space meters and as such may have limited space for cash vaults, batteries and solar panels. Although referred to as single space meters, they are capable of monitoring additional parking spaces. For example, it is common to provide a single space parking meter to monitor two parking spaces.

Alphanumeric keypads have been provided in multi space parking meters. However due at least in part to space restrictions they have not been used in single space parking meters.

BRIEF DESCRIPTION OF THE DRAWINGS

Features, aspects and advantages of the present disclosure will become better understood with regard to the following description and accompanying drawings in which:

FIG. 3A depicts a single space parking similar to that of FIG. 1 but incorporating the SPI keyboard module of FIG. 2B;

FIG. 3B depicts a single space parking similar to that of FIG. 3B but incorporating a different SPI keyboard module;

DETAILED DESCRIPTION

Figure 1:
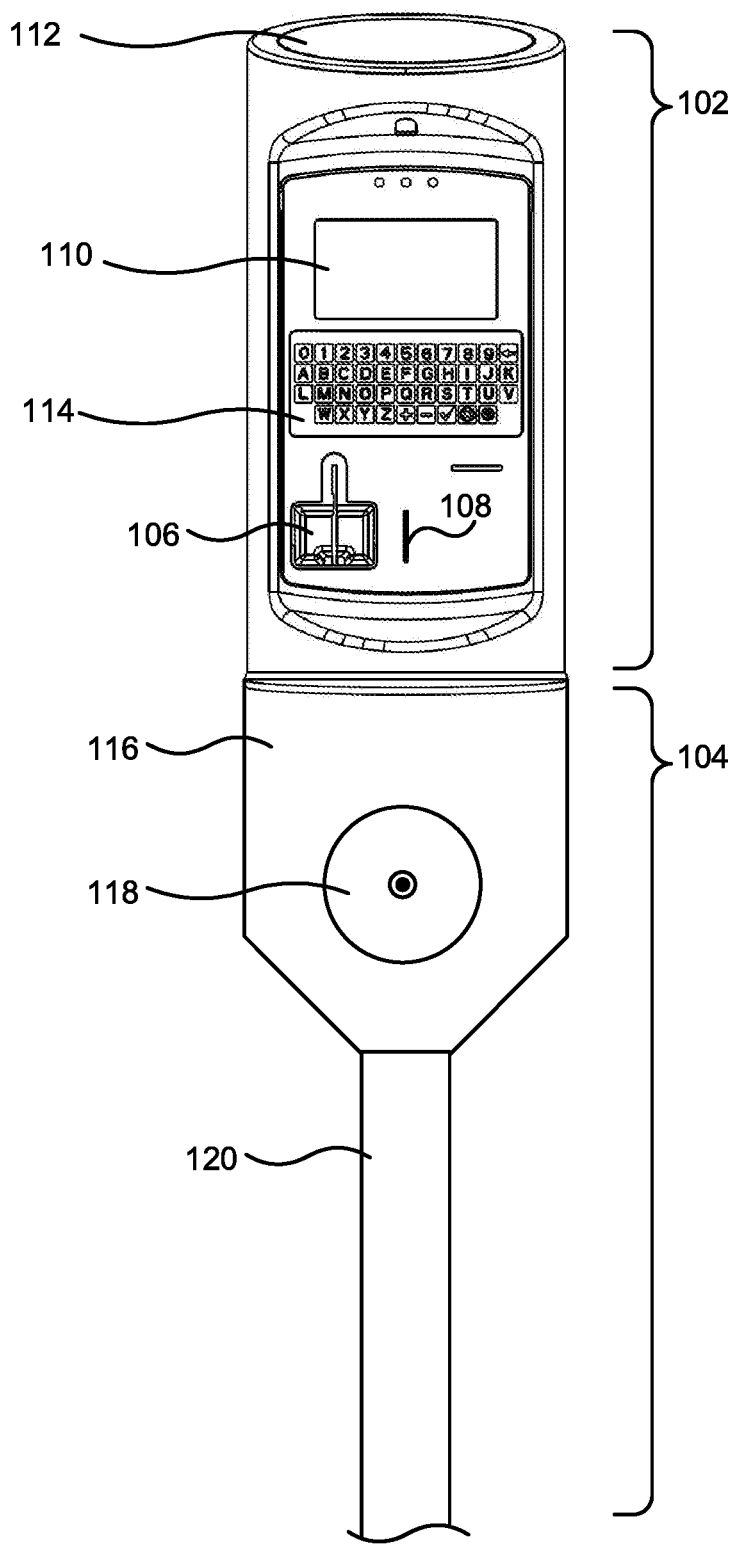
FIG. 1 depicts a single space parking meter incorporating an SPI keyboard module.

In accordance with the present disclosure there is provided a parking meter comprising: at least one parking meter controller executing instructions to configure the parking meter to provide: operating functionality; and a keyboard interface comprising a serial peripheral interface (SPI) bus interface; and an SPI keyboard module connected to the at least one parking meter controller by an SPI bus, the SPI keyboard module comprising: a plurality of key switches; and at least one keyboard controller configured to: detect pressing of a key switch of the plurality of key switches; determine a predetermined indicator associated with the detected key switch that was pressed; and transmit over the SPI bus the predetermined indicator associated with the pressed key to the keyboard interface of the at least one parking meter controller.

In a further embodiment of the parking meter, the keyboard interface receives the predetermined indicator transmitted by the SPI keyboard module and maps the received predetermined indicator to a particular key.

In a further embodiment of the parking meter, keyboard interface uses a keyboard mapping associated with the SPI keyboard module for mapping the received predetermined indicator to a particular key.

In a further embodiment of the parking meter, the keyboard interface determines a keyboard identifier of the SPI keyboard module and selects the keyboard mapping based on the keyboard identifier.

In a further embodiment of the parking meter, the keyboard mapping is associated with the keyboard identifier.

In a further embodiment of the parking meter, the keyboard mapping is associated with a keyboard type and the keyboard interface determines the keyboard type using the received keyboard identifier.

In a further embodiment of the parking meter, the keyboard type is communicated to the operating functionality and the operating functionality enables or disables one or more features of the parking meter based on the keyboard type.

In a further embodiment of the parking meter, the keyboard identifier is communicated to the operating functionality and the operating functionality enables or disables one or more features of the parking meter based on the keyboard identifier.

In a further embodiment of the parking meter, the keyboard interface determines the keyboard identifier when the SPI keyboard module is first connected to the at least one parking meter controller by the SPI bus.

In a further embodiment of the parking meter, the keyboard interface queries the SPI keyboard module to provide the keyboard identifier.

In a further embodiment of the parking meter, the SPI bus comprises: a chip select (CS) signal line associated with the SPI keyboard module for carrying a chip select signal indicative of when the keyboard module can transmit to the at least one keyboard controller; a serial clock (SCLK) signal line for carrying a clock signal for controlling signal timing; a master in slave out (MISO) signal line for carrying serially transmitted data from the SPI keyboard module to the at least one parking meter controller; and a master-out-slave-in (MOSI) signal line for carrying serially transmitted data from the at least one parking meter controller to the SPI keyboard module.

In a further embodiment of the parking meter, the keyboard controller is configured to: monitor the CS signal line in a transmission mode when data is to be transmitted to the at least one parking meter controllers.

In a further embodiment, the parking meter further comprises an attention (ATTN) signal line connecting the SPI keyboard module to the at least one parking meter controller, and wherein the keyboard controller is configured to: switch from a sleep mode to the transmission mode when a key press is detected; and raise a signal on the ATTN signal line providing an indication to the at least one parking meter controller that there is data to transmit.

In a further embodiment of the parking meter, the keyboard controller is further configured to: switch from the transmission mode to the sleep mode when there is no more data to transmit to the at least one parking meter controller.

In a further embodiment of the parking meter, the keyboard controller detects pressing of the key switch by: detecting a trigger indicative of pressing of the key switch; and scanning the plurality of key switches to determine which key switch was pressed.

In a further embodiment of the parking meter, the keyboard interface transmits a keyboard command comprising a command identifier to the SPI keyboard module over the SPI bus, and wherein the keyboard controller of the SPI keyboard module receives and processes the keyboard command.

In a further embodiment of the parking meter, the keyboard command comprises one or more of: a mode command changing an operating mode of the SPI keyboard module; a configuration command setting a configuration parameter value of the SPI keyboard module; a query command querying configuration parameter values of the SPI keyboard module; and an action command causing the SPI keyboard module to perform an action.

In a further embodiment of the parking meter, the SPI keyboard module further comprises a feedback device capable of providing feedback of key presses.

In a further embodiment of the parking meter, the feedback device comprises a piezoelectric buzzer capable of providing auditory feedback.

In a further embodiment of the parking meter, the SPI keyboard module further comprises a light emitting diode (LED) device for lighting at least a portion of the plurality of key switches.

In a further embodiment of the parking meter, the plurality of key switches comprise at least 4 key switches.

In a further embodiment of the parking meter, the plurality of key switches comprise key switches for: a left key; a plus key; a minus key; an OK key; a cancel key; and a right key.

In a further embodiment of the parking meter, the plurality of key switches provide key switches for alphanumeric keys.

In a further embodiment of the parking meter, the parking meter is a single space parking meter.

In a further embodiment of the parking meter, the parking meter is a multi-space parking meter.

In a further embodiment, the parking meter further comprises a second SPI keyboard module connected to the at least one parking meter by the SPI bus.

In accordance with the present disclosure there is further provided an SPI keyboard module for connection to a parking meter controller in a parking meter by an SPI bus, the SPI keyboard module comprising: a plurality of key switches; and at least one keyboard controller configured to: detect pressing of a key switch of the plurality of key switches; determine a predetermined indicator associated with the detected key switch that was pressed; and transmit over the SPI bus the predetermined indicator associated with the pressed key to the keyboard interface of the parking meter controller.

In a further embodiment of the SPI keyboard module, the SPI bus comprises: a chip select (CS) signal line associated with the SPI keyboard module for carrying an chip select signal indicative of when the keyboard module can transmit to the keyboard controller; a serial clock (SCLK) signal line for carrying a clock signal for controlling signal timing; a master in slave out (MISO) signal line for carrying serially transmitted data from the SPI keyboard module to the parking meter controller; and a master-out-slave-in (MOSI) signal line for carrying serially transmitted data from the parking meter controller to the SPI keyboard module.

In a further embodiment of the SPI keyboard module, the keyboard controller is configured to: monitor the CS signal line in a transmission mode when data is to be transmitted to the parking meter controllers.

In a further embodiment, the SPI keyboard further comprises a connector to an attention (ATTN) signal line for connecting the SPI keyboard module to the at least one parking meter controller, and wherein the keyboard controller is configured to: switch from a sleep mode to the transmission mode when a key press is detected; and raise a signal on the ATTN signal line through the connector providing an indication to the at least one parking meter controller that there is data to transmit.

In a further embodiment of the SPI keyboard module, the keyboard controller is further configured to: switch from the transmission mode to the sleep mode when there is no more data to transmit to the at least one parking meter controller.

In a further embodiment of the SPI keyboard module, the keyboard controller detects pressing of the key switch by: detecting a trigger indicative of pressing of the key switch; and scanning the plurality of key switches to determine which key switch was pressed.

In a further embodiment of the SPI keyboard module, the keyboard controller is configured to receive and process a keyboard command comprising a command identifier over the SPI bus.

In a further embodiment of the SPI keyboard module, the keyboard command comprises one or more of: a mode command changing an operating mode of the SPI keyboard module; a configuration command setting a configuration parameter value of the SPI keyboard module; a query command querying configuration parameter values of the SPI keyboard module; and an action command causing the SPI keyboard module to perform an action.

In a further embodiment, the SPI keyboard further comprises a feedback device capable of providing feedback of key presses.

In a further embodiment of the SPI keyboard module, the feedback device comprises a piezoelectric buzzer capable of providing auditory feedback.

In a further embodiment of the SPI keyboard module, the SPI keyboard module further comprises an LED device for lighting at least a portion of the plurality of key switches.

In a further embodiment of the SPI keyboard module, the plurality of key switches comprise at least 4 key switches.

In a further embodiment of the SPI keyboard module, the plurality of key switches comprise key switches for: a left key; a plus key; a minus key; an OK key; a cancel key; and a right key.

In a further embodiment of the SPI keyboard module, the plurality of key switches provide key switches for alphanumeric keys.

In accordance with the present disclosure there is further provided an SPI touch screen module for connection to a parking meter controller in a parking meter by an SPI bus, the SPI touch screen module comprising: a touch screen display; a touch sensor overlaid on the touch screen; a display controller configured to: receive display information from the parking meter controller; and display at least one virtual key on the touch screen display according to the received display information; and at least one keyboard controller configured to: detect a touch at a location on the touch sensor; and transmit over the SPI bus an indication of the location on the touch sensor of the detected touch to the keyboard interface of the parking meter controller.

Single space parking meters and multi space parking meters can be used by different companies, cities, governments, etc., referred to as operators for brevity, for monitoring parking spaces. Different operators may have different requirements for their parking meters and as such parking meter designs are often modified to suit the different needs of the different operators. A parking meter keyboard module is described further below that provides flexibility in using different keyboard layouts. Different keyboard modules can be used without requiring significant changes to the underlying parking meter control. The keyboard modules also can provide low power consumption making them well suited for use in single space parking meters.

FIG. 1 depicts a single space parking meter incorporating an SPI keyboard module. The parking meter 100 has an upper portion 102 that is secured to a lower portion 104. The upper portion houses the main components of the parking meter 100. While the particular components may vary from meter to meter they may include a payment means such as a card reader 106 for reading payment cards as well as a coin slot 108 for accepting coins. The parking meter includes a display 110 for displaying information such as instructions, parking time purchased, time remaining etc. A solar panel 112 may be positioned on the parking meter 100 and may provide power to the parking meter to charge a battery in order to extend an operating life of the parking meter. In addition to the payment means, display and solar panel, the parking meter includes a keyboard 114. As depicted in FIG. 1, the keyboard 114 may be an alphanumeric keyboard including all of the letters 'A' to 'Z', the number 0 to 9 as well as additional keys such as a plus key, a minus key, an 'OK' key, a cancel key and a language key. As described in further detail below, the keyboard 114 is provided by a serial peripheral interface (SPI) keyboard module. The SPI keyboard module allows different keyboard layouts to be used without requiring further changes to the parking meter components. An SPI keyboard interface provided by, for example, the main parking meter controller is able to communicate with different SPI keyboard modules regardless of the keyboard layouts, and determine keys that have been pressed. In addition to providing easy flexibility for using different keyboard layouts, the SPI keyboard module can provide low power consumption, making it well suited for use in single space parking meters that may have limited space for batteries.

The keyboard 114 allows a user to input various information into the parking meter 100. For example, the keyboard 114 may be used to provide pay-by-space functionality or pay-by-plate functionality, both of which are common to multi-space meters. Pay-by-space functionality allows a user to pay for a particular parking spot that is associated with an identifying number by entering the number into the parking meter and purchasing the desired amount of time. Pay-by-plate functionality allows a user to purchase parking time that is associated with a license plate or vehicle identification number (VIN) by entering the license plate or last few digits of the VIN into the parking meter and purchasing the desired amount of parking time. Additional functionality may be provided that makes use of the keyboard 114. For example, a user could enter a telephone number in order to receive notifications of expiry of the purchased parking time or an e-mail address to receive a payment receipt.

The upper portion of the parking meter 102 is secured to the lower portion 104. The lower portion comprises a vault 116 for coins inserted into the coin slot 108. The vault 116 may have a vault door 118 for removal of the collected coins. The vault 116 can be secured to a post 120 or other structure that secures the parking meter 100 in a desired location.

Figure 2A:
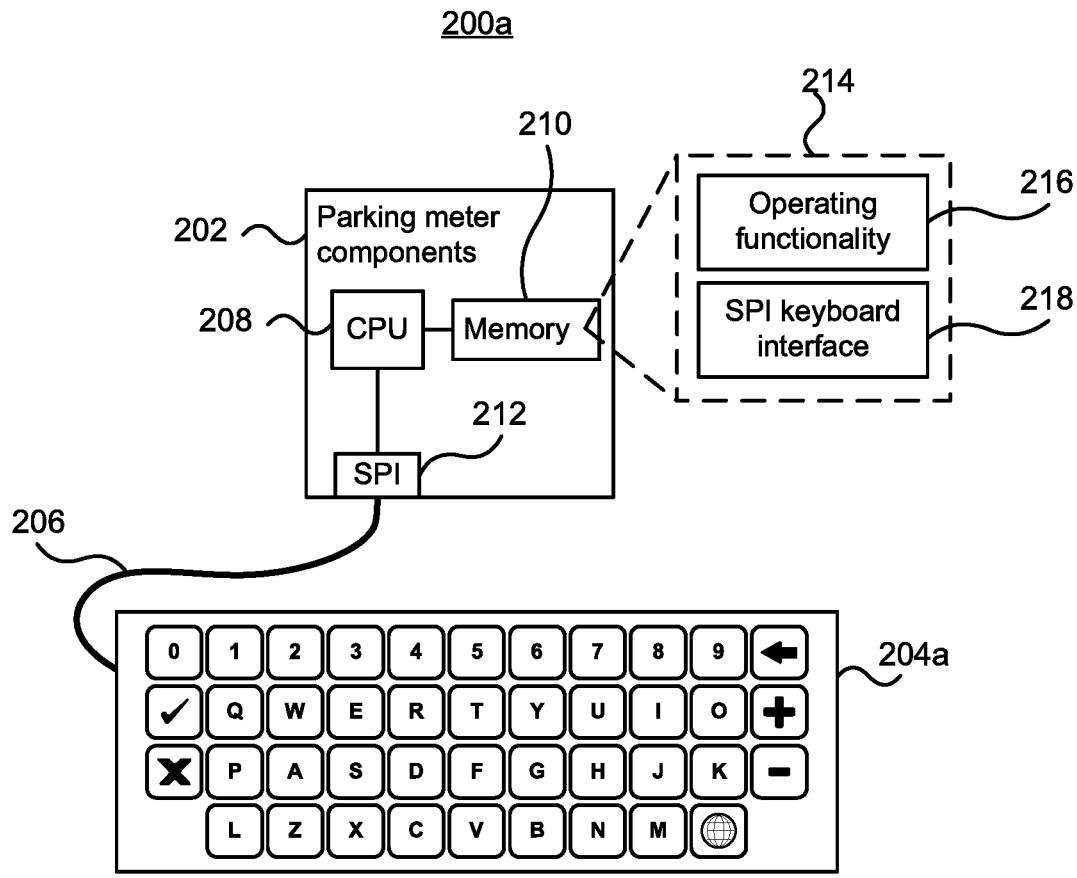
FIG. 2A depicts parking meter components and an alphanumeric SPI keyboard module.

FIG. 2A depicts parking meter components and an alphanumeric SPI keyboard module. The parking meter 200a comprises main parking meter components 202, an SPI keyboard module 204a connected to the parking meter components by an SPI bus 206. The main parking meter components include at least one processor or controller, depicted as CPU 208, that executes instructions stored in memory 210. The parking meter components may further include a physical connection 212 to the SPI bus. When the instructions stored in the memory 210 are executed, they configure the parking meter components 202 order to provide various functionality 214 to the parking meter. The functionality 214 includes operating functionality 216, which broadly provides the parking meter functions, for example the timing functionality, purchasing functionality, communication functionality, etc. It will be appreciated that the operating functionality may include a wide variety of different functionality which is not described in detail. Regardless of the particular operating functionality, it is necessary to provide user input to the operating functionality, for example in order to allow a user to specify a desired amount of time to purchase. The user input may include further input for example to control, review, or set operating parameters of the parking meter.

The functionality 114 further includes SPI keyboard interface functionality 218 that communicates with the SPI keyboard module 204a over the SPI bus 206. The SPI keyboard interface functionality 218 receives an indicator of a particular key that was pressed and maps the indicator to a key which is communicated to the operating functionality 216. For example, the SPI keyboard interface functionality 218 may receive an indicator of '15' over the SPI bus 206 indicating that key number 15 was pressed. The SPI keyboard interface functionality 218 maps the received indicator to a key of the keyboard, for example '15' may be mapped to a key 'e'. The particular mapping used by the SPI keyboard interface 218 for mapping an indicator to a key may change depending upon the keyboard used.

Figure 2B:
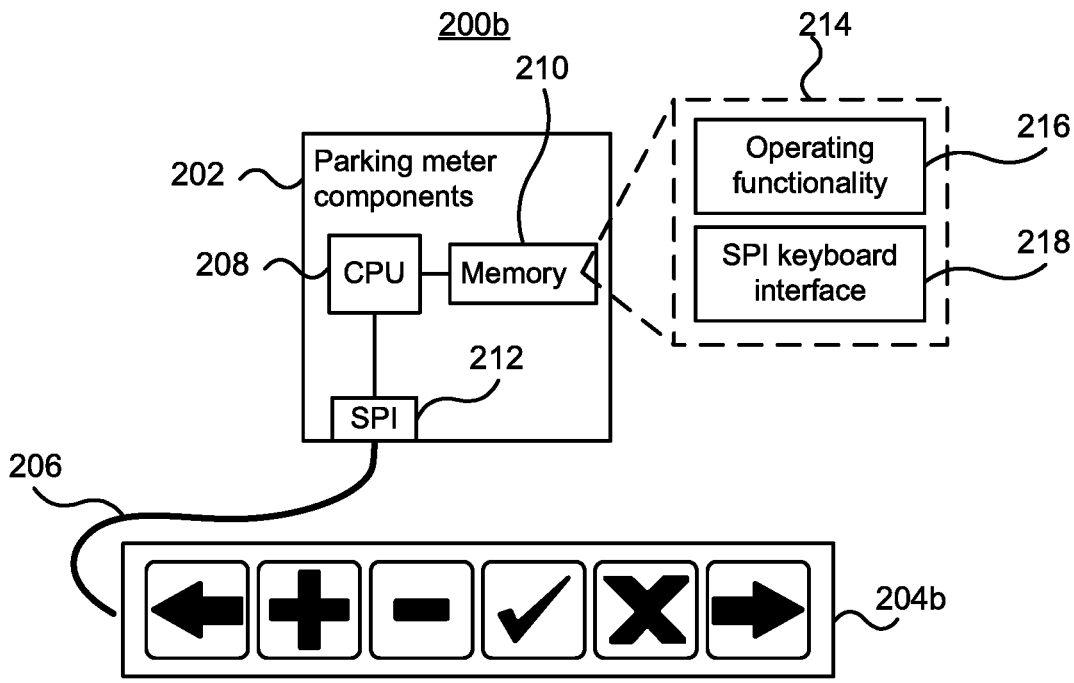
FIG. 2B depicts parking meter components and a 6-key SPI keyboard module.

FIG. 2B depicts parking meter components and a 6-key SPI keyboard module. The parking meter 200b is substantially the same as parking meter 200a except that a different SPI keyboard module 204b is connected to the SPI bus 206. The SPI keyboard module 204b layout is significantly different from that of the alphanumeric SPI keyboard module 204a and comprises 6 keys. Although the SPI keyboard module 204b has a significantly different layout from that depicted in FIG. 2A, the parking meter components 202 and in particular the operating functionality 216 and the SPI keyboard interface functionality 218 remains the same as described above for parking meter 200a. In order to operate correctly with the different keyboard layout depicted in FIG. 2B, the mapping used by the SPI keyboard interface 218 to map a received indicator to a key is selected for the particular keyboard. The mapping may be loaded into the SPI keyboard interface functionality during a manufacturing stage, an assembly stage, a setup or configuration stage or during an in-use stage while the parking meter is installed in the field. The mapping may be loaded manually at the meter by a technician, or the mapping may be loaded automatically based on the particular SPI keyboard module connected to the parking meter components. Additionally or alternatively, the meter may have the ability to establish a communication channel with a remote management server or a mobile data source to automatically request and download the correct mapping data corresponding to the connected SPI keypad from that remote management server or mobile data source. The SPI keyboard interface functionality 218 allows different keyboard layouts to be used with minimal changes, if any, to the operating functionality, as well as minimizing manual intervention at the meter by a technician.

FIG. 3A depicts a single space parking similar to that of FIG. 1 but incorporating the SPI keyboard module of FIG. 2B. The parking meter 300a is substantially the same as parking meter 100 described above. However, rather than having an alphanumeric keyboard, the parking meter 300a comprises a limited 6-key keyboard. The different keyboard layout can be used without having to reconfigure the operating functionality, which allows a common parking meter component configuration to be used across multiple different parking meter implementations. The use of common parking meter component configuration, including the operating functionality and SPI keyboard interface functionality can simplify maintenance, development and support since many fewer versions of the operating functionality need to be provided. The operating functionality may be designed to support a wide range of keyboard layouts so that switching keyboard layouts does not require any significant changes.

In addition to providing flexibility for making large changes to parking meter layouts, such as using an alphanumeric keyboard as depicted in FIG. 1 versus the 6-key iconic keyboard of FIG. 3A, the SPI keyboard interface 218 also provides flexibility for making smaller changes to the keyboard layout, such as switching the particular key locations.

FIG. 3B depicts a single space parking similar to that of FIG. 3A but incorporating a different SPI keyboard module. The parking meter 300b is substantially similar to the parking meter 300a, however the SPI keyboard module 300b has a slightly different key layout, with the locations of the 'plus' key and the 'minus' key switched. The different keyboard layout of the SPI keyboard 300b only requires a different key mapping be used by the SPI keyboard interface. If the SPI keyboard module identifies to the meter specific data that identifies a particular layout, the meter can dynamically adjust its behavior to a given keypress to correspond to the specific layout.

Figure 4:
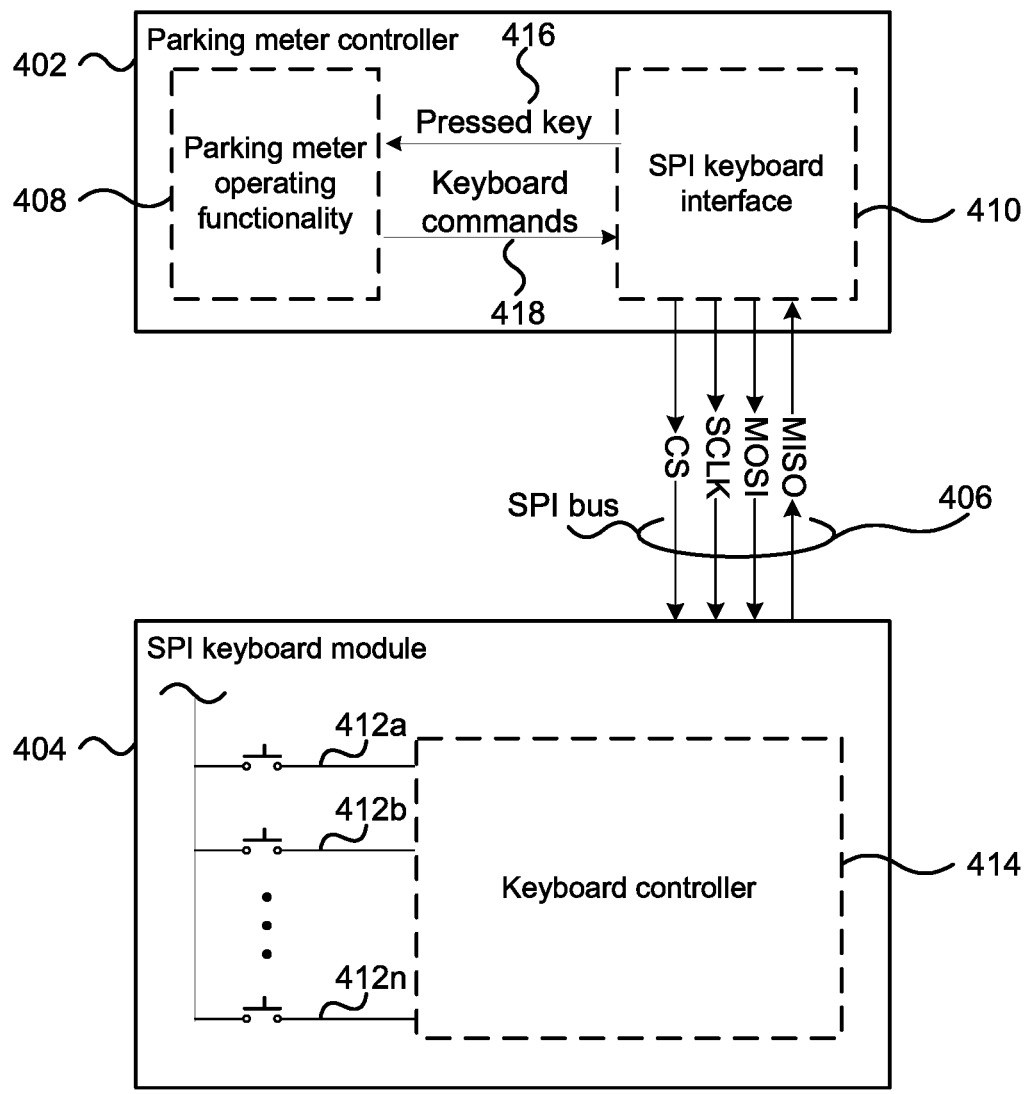
FIG. 4 depicts parking meter components of a parking meter incorporating an SPI keyboard module.

FIG. 4 depicts parking meter components of a parking meter incorporating an SPI keyboard module. The parking meter components 400 comprise at least one parking meter controller 402 that is connected to at least one SPI keyboard module 404 by an SPI bus 406. The at least one parking meter controller may implement various functionality through a combination of hardware, firmware and software. The functionality includes parking meter operating functionality 408 as well as SPI keyboard interface functionality 410.

The SPI keyboard module 404 comprises a plurality of key switches 412a, 412b, 412n (referred to collectively as key switches 412). The key switches may be for example piezoelectric switches. Each of the key switches 412a are connected to a keyboard controller 414 that determines which of the key switches were pressed and communicates the pressed key switch to the SPI keyboard interface functionality 410 over the SPI bus 406. The keyboard controller 414 may be provided by for example a microcontroller configured by firmware and/or software. The keyboard controller monitors the key switches 412 to detect when a key switch is pressed. For example, when a key switch is pressed, it may cause a detectable voltage change at the keyboard controller, and so by monitoring for the voltage change, it is possible to detect when a key switch is pressed. When a key press is detected, the keyboard controller 414 determines a predetermined indicator associated with the pressed key switch to the SPI keyboard interface functionality 410 over the SPI bus. The predetermined indicator may be, for example a number of the key switch. For example key switch 412a may be assigned the number '1', key switch 412b may be assigned the number '2' etc. The keyboard controller communicates the indicator to the SPI keyboard interface functionality 410 which receives the indicator and maps the predetermined indicator to a pressed key. For example the indicator '1' may be mapped to a letter 'A' key. Once the pressed key is determined it can be provided to the parking meter operating functionality 408, which can take appropriate action.

The predetermined association between key switches and the indicator does not need may be any particular association and may change, either for different SPI keyboard modules or for the same SPI keyboard module over time. However the predetermined association between the key switches and indicators should be determined prior to the keys being pressed in use in order to be able to correctly map between the indicator and the key associated with the key switch by the SPI keyboard interface.

The SPI bus 406 connecting the at least one parking meter controller 402 also known as the MASTER device to the SPI keyboard module 404 also known as the SLAVE device comprises 4 signal lines including a master driven chip select (CS) signal line, a master driven serial clock signal line (SCLK), a slave driven master in slave out (MISO) signal and a master driven master-out-slave-in (MOSI) signal line. The chip select (CS) signal line is for carrying a chip select signal generated by the SPI keyboard interface which acts as the master of the SPI bus. The CS signal is indicative of when the keyboard module can transmit data to the keyboard controller or more particularly the SPI keyboard interface functionality provided by the keyboard controller. If no other devices use the SPI bus 406, the CS signal line could be omitted. The slave clock (SCLK) signal line for carrying a clock signal for controlling signal timing. The slave clock is generated by the master and provides the timing for clocking in/out the serial data. The master in slave out (MISO) signal line is for carrying serially transmitted data, such as the indicator of the pressed key switch, from the SPI keyboard module to the parking meter controller. The master-out-slave-in (MOSI) signal line is for carrying serially transmitted data from the parking meter controller to the SPI keyboard module. This data may include commands such as commands for setting operating characteristics of the SPI keyboard module 404. The commands may be provided to the SPI keyboard interface 410 by the parking meter operating functionality 408 as depicted by keyboard commands 418. Additionally, or alternatively, the commands may be generated by the SPI keyboard interface functionality 410.

While the parking meter components depicted in FIG. 4 may provide the flexibility of using different SPI keyboard modules with little modifications, if any, required to the operating functionality of the parking meter controller, it requires the SPI keyboard module to constantly monitor the CS signal line to determine when it is able to transmit data, such as what key is or was pressed. This constant monitoring of the CS signal line may unnecessarily consume power. As described further below, a lower power SPI keyboard module may be provided that does not require the parking meter controller to poll the SPI keyboard module to determine if a key is pressed.

Figure 5:
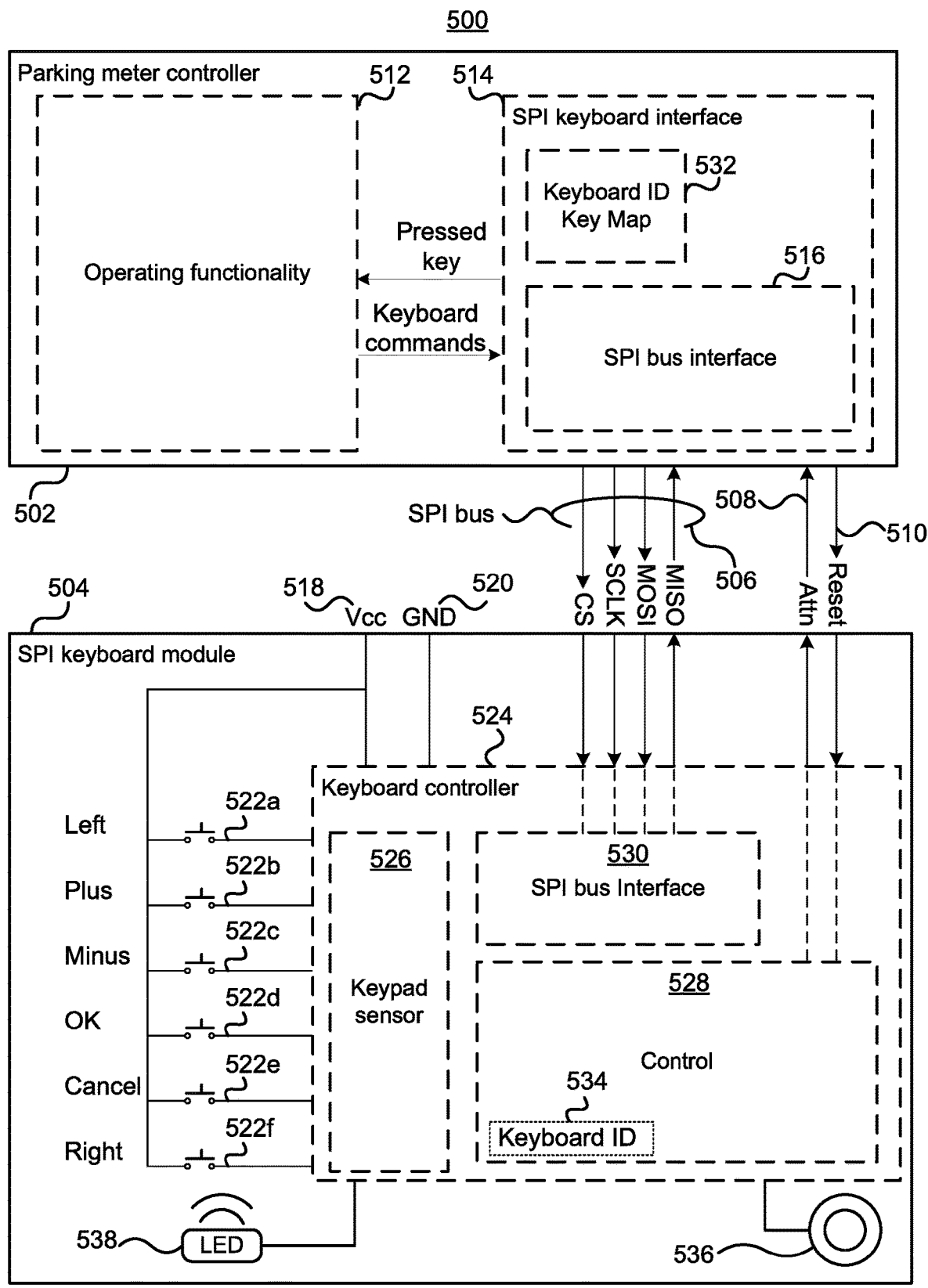
FIG. 5 depicts parking meter components of a further parking meter incorporating a low power SPI keyboard module.

FIG. 5 depicts parking meter components of a further parking meter incorporating a low power SPI keyboard module. The parking meter components 500 comprise at least one parking meter controller 502 and an SPI keyboard module 504. The SPI keyboard module 504 is connected to the at least one parking meter controller 502 by an SPI bus, comprising a CS signal line, SCLK signal line, MOSI signal line, and MISO signal line, which have the same functionality of the corresponding signal lines of the SPI bus 406 described above. The SPI keyboard module 504 has an additional signal line, 'ATTN, 508 an acronym for "attention' that can signal to the at least one parking meter controller that a key was pressed. The SPI keyboard module is also depicted as being connected to the at least one parking meter controller by a Reset signal line 510 that can cause the SPI keyboard module to reset to an initial or defined state.

The at least one parking meter controllers are configured, for example by hardware, firmware and software, to provide operating functionality 512 and SPI keyboard interface functionality 514. The SPI keyboard interface functionality 514 may comprise an SPI bus interface that generates the appropriate signals to be transmitted over the SPI bus 506 as well as monitoring the ATTN signal line 508 the SPI bus 506. The SPI bus may further process received data to determine a key that was pressed and communicate the pressed key to the operating functionality 512 for further processing.

The SPI keyboard module includes a power connection Vcc 518 and Gnd 520 which may be provided by the battery (not shown) or power circuitry of the parking meter. Vcc 518 and Gnd 520 may be supplied to the microcontroller or other circuitry that implements the keyboard controller. The SPI keyboard module 504 comprises a plurality of key switches 522a, 522b, 522c, 522d, 522e, 522b (referred to collectively as key switches 522). Six (6) key switches are depicted in FIG. 5, however fewer or more key switches can be provided. Vcc 518 is depicted as being connected to each of the key switches 522 for illustrative purposes to highlight the signal provided to the keyboard controller 524 when a key switch is pressed, or closed. The connection depicted in FIG. 5 is intended to be illustrative and different arrangements for providing a detectable voltage, or current, change to the keyboard controller when a key switch is pressed are possible. As depicted in FIG. 5 each key switch is associated with a key. Key switch 522a is associated with the 'Left' key, key switch 522b is associated with the 'Plus' key, key switch 522c is associated with the 'Minus' key, key switch 522d is associated with the 'OK' key, key switch 522e is associated with the 'Cancel' key, and key switch 522f is associated with the 'Right' key. The visual association between a key switch and the key is generally made by printing a representation of the key on the key switch, however at the SPI keyboard controller each key may be assigned a numeric data value, and that numeric data value is then passed through the SPI interface to the parking meter controller where the association of the numeric data value is mapped to the keypad function matching the visual association. Alternatively the SPI keyboard controller may assign an ASCII data value associated with the actual character that the key represents.

The keyboard controller 524 may comprise a keypad sensor 526 that detects when a key switch was pressed and communicates which key switch was pressed to control functionality 528 of the keyboard controller 524. The keypad sensor 526 can provide a predetermined indicator associated with the key switches 522 to the control functionality 528. The control functionality 528 can then transmit the indicator to the SPI keyboard interface 514 over the SPI bus 506. SPI bus interface functionality 530 may provide the SPI bus functionality for transmitting over the SPI bus, such as monitoring the CS signal line and then clocking the data to be transmitted out over the MISO signal line and clocking data in over the MOSI signal line according to the SCLK line timing signal. In order to avoid constantly asserting the CS signal line to poll the SPI keyboard module to determine if a key has been pressed, which may unnecessarily consume power, the parking meter controller, or the SPI keyboard interface functionality 514 of the parking meter controller, can operate in a sleep mode when no data is ready to be transmitted by the SPI keyboard module. When a key has been pressed the SPI keyboard module 504 can wake the parking meter controller 502, or the SPI keyboard interface 514 of the parking meter controller using the ATTN line 508.

In order to transmit the indicator of the key switch that was pressed to the SPI keyboard interface, the control functionality asserts the ATTN line, by pulling the line from a normal high voltage level to a low level. Asserting the signal on the ATTN line indicates to the SPI keyboard interface that the SPI keyboard module is waiting to transmit data. When the control functionality 528 of the SPI keyboard module asserts the ATTN line 508, it causes the SPI bus interface 516 to wake up from the low power sleep mode and assert the CS signal line as well as drive the SCLK signal line in order to clock data in from the SPI keyboard module, as well as clock data out to the SPI keyboard module if there is any to transmit. Once the SPI keyboard module asserts the ATTN line 508, it may enter a transmission mode and waits for the appropriate CS signal line to be asserted and then clocks data of the pressed key out to the SPI bus interface 516 and clocks any data in from the SPI bus interface 516

The SPI keyboard interface functionality 514 of the parking meter controller 502, or more particularly the SPI bus interface functionality 516 generates the timing clock signal on the SCLK signal line, which will cause the SPI bus interface 530 of the SPI keyboard module 504 to clock out the indicator of the key switch that was pressed. The SPI bus interface 516 of the SPI keyboard interface functionality 514 clocks in the transmitted data, and also clocks out any data to be transmitted to the SPI keyboard module 504. Although described as entering the transmission mode only when data is ready to be transmitted, the keyboard controller may periodically raise the signal on the ATTN line in order to provide a heartbeat signal to the parking meter controller indicating that the SPI keyboard module 504 is functioning properly. When the ATTN line is asserted, the SPI keyboard interface 514 of the parking meter controller 502 may transmit any data or commands to the SPI keyboard module.

When the keyboard interface functionality 514 receives the predetermined indicator of the key switch that was pressed, the keyboard interface functionality 514 maps the indicator to the key associated with the key switch. The mapping may use a key map 532 that provides a mapping between predetermined indicators, which are associated with key switches, and keys, which are also associated with the key switches. For example, the keypad sensor may associate predetermined indicators with key switches as set forth in Table 1.

TABLE 1 association between key switches and predetermined indicators

| Key switch | Predetermined indicator |
| --- | --- |
| 522a | 1 |
| 522b | 2 |
| 522c | 3 |
| 522d | 4 |
| 522e | 5 |
| 522f | 6 |

The particular predetermined indicator associated with each key switch is not particularly important, for example key switch 522a could be associated with a predetermined indicator of '1' or '55' without changing the operation of the SPI keyboard module. Although the predetermined indicator associated with each key switch may change, in order for the SPI keyboard interface to properly map the indicator to the corresponding key, the association between the key switches and indicators should correspond with the mapping used by the keyboard interface functionality 514. The key map 532 used by the keyboard interface functionality 514 for mapping the key switches 522 to the corresponding keys depicted in FIG. 5 are set forth in Table 2.

TABLE 2 association between key switches and predetermined indicators

| Predetermined indicator | Key |
| --- | --- |
| 1 | Left |
| 2 | Plus |
| 3 | Minus |
| 4 | OK |
| 5 | Cancel |
| 6 | Right |

Once the received indicator is mapped to the corresponding key, the keyboard interface functionality 514 can communicate the key to the operating functionality of the parking meter controller 512.

As described above, the predetermined indicators associated with a key switches need to correspond to the key map used for the particular SPI keyboard module 504. The key map 532 can be manually changed if the SPI keyboard module is changed. However, greater flexibility is possible by associating the key map with a keyboard ID. The SPI keyboard module 504 may have a keyboard ID 534 which can be communicated to the keyboard interface functionality 514 over the SPI bus 506. The keyboard interface functionality can use the keyboard ID to load or request from the remote system the appropriate key map for subsequent use. Although the keyboard ID is described and depicted as being associated with the keyboard map, the keyboard ID may be associated with a keyboard type which in turn is associated with the keyboard map.

The SPI keyboard module 504 may have additional components such as a feedback device, which is depicted as a piezoelectric buzzer 536. The control functionality 528 may cause the buzzer 536 to beep, not beep or set the duration of the beep when keys are pressed. Additionally or alternatively, the keys may be illuminated, for example by an LED 538. While a single LED 538 is depicted in FIG. 5, one or more LEDs may be used to provide illumination of the keys. The LED(s) may be used to illuminate the keys from behind or underneath the keys, providing a backlighting of the individual keys. Additionally or alternatively the LED(s) may be located about a perimeter of an area of the keys to illuminate the faces of the keys and surrounding area. The LED(s) may be provided with lenses, diffusers and/or light pipes in order to provide the desired illumination. The control functionality 528 can control when the LED is on as well as its power level. The SPI keyboard module 504 may have additional components or functionality not depicted. For example, in order to provide a full alphanumeric keypad in a small form factor, the key sizes and spacings between them may be small, which for piezoelectric key switches, may cause cross-talk signal between adjacent key switches, causing it to potentially appear as if key switches were pressed that in fact were not pressed. In order to eliminate such fake presses, the SPI keyboard module may include filtering functionality to filter out the fake presses.

The keyboard interface functionality may receive keyboard commands from the operating functionality, or may generate keyboard commands itself. The keyboard commands are transmitted to the SPI keyboard module 504 over the SPI interface 506 and allow the operation of the SPI keyboard module 504 to be controlled. The commands may include mode commands that change an operating mode of the SPI keyboard module. For example, a mode command may cause the keyboard controller to switch to an off or low power mode in which the keyboard controller does not monitor for key presses, which may be useful during times when parking is free, as well as return to an on or normal mode in which key presses are monitored. The commands may further include configuration commands that can change operating characteristics of the SPI keyboard module. For example, these may include, providing new firmware or software, changing the predetermined indicators associated with key switches, setting or changing the keyboard ID 534, changing feedback characteristics such as how long a key press beep is, and changing how long the LED(s) light stays on and its power level. The commands may include query commands which allow the keyboard interface of the parking meter controller to query the SPI keyboard module to provide requested parameters, such as the keyboard ID or other parameters. The commands may further comprise action commands which cause the SPI keyboard module to perform an action, such as turning on or flashing the LED(s) light or beeping the buzzer.

The above has described the use of an SPI bus to communicate between the at least one parking meter controller 502 and the SPI keyboard module 504. The particular communication protocol definition used to communicate over the SPI bus may vary as long as the SPI keyboard interface functionality 514 and the SPI keyboard module 504 implement compatible protocol definitions. The communication protocol definition may specify details such as signal voltages representing highs and lows, clock phase and clock edges for data capture/reading, minimum and/or maximum timing values such as a maximum clock frequency for transmitting the serial data, a word length and encoding used for transmitting data as well as other communication details.

Figure 6:
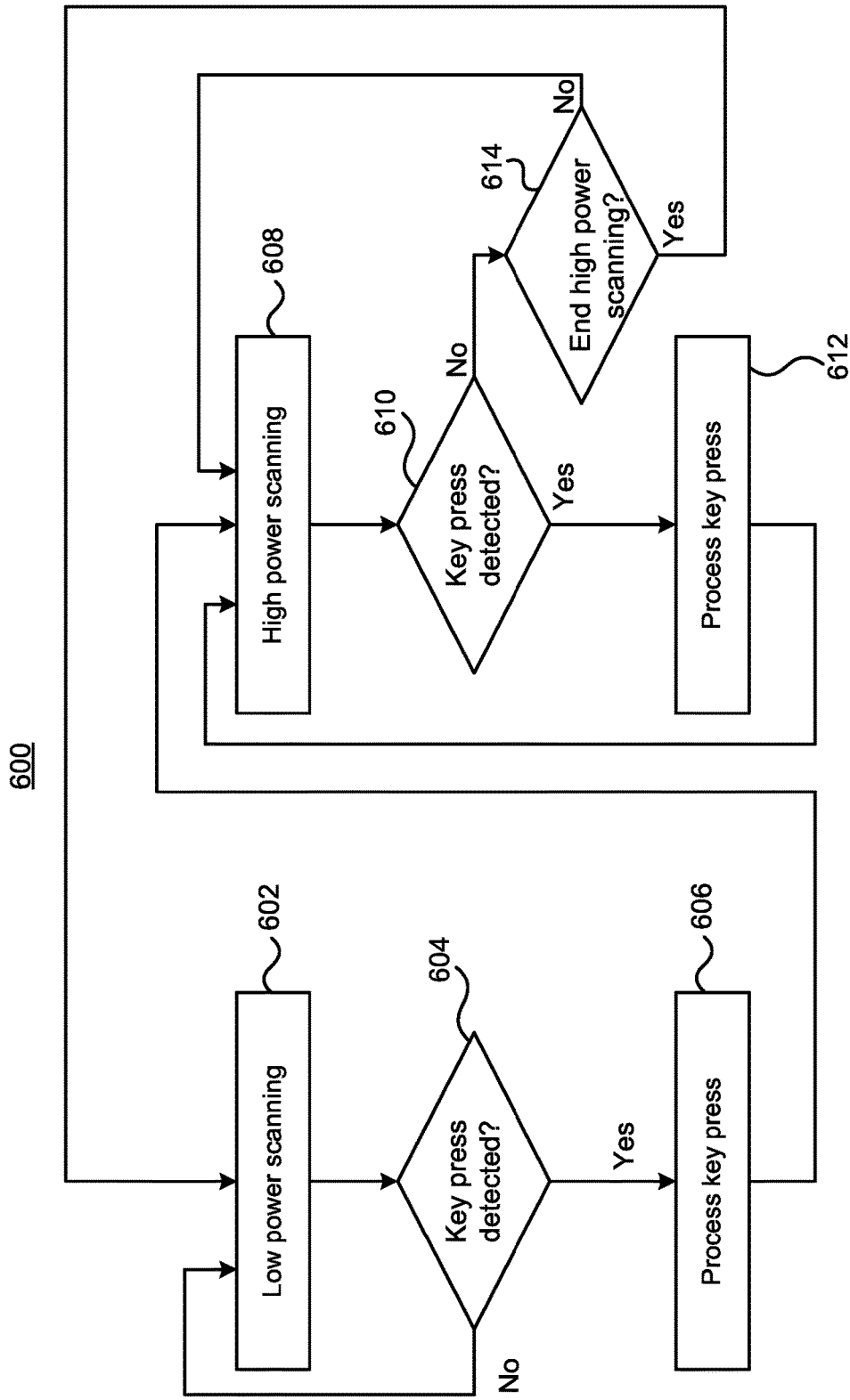
FIG. 6 depicts a method of detecting a key press.

FIG. 6 depicts a method of detecting a key press. As described above, key switches may cause a voltage, or current, change at the keyboard controller 524. The keyboard controller 524 may continuously scan or monitor the key switches or other related criteria in order to detect a key press. The keyboard controller circuits may scan or monitor the keys at a constant frequency or at a level that is high enough to detect each of a plurality of key presses. However, while such a scanning frequency or monitoring level may be desirable to detect and distinguish between subsequent key presses which may occur relative soon after each other, it may be unnecessarily high to detect an initial key press. The method 600 uses variable frequency scanning or a low power level monitoring circuit to provide a low power scanning to detect an initial key press followed by a higher power scanning which scans for key presses at a higher frequency. The method 600 begins while operating in a lower power monitoring or scanning mode 602 in which the key switches are scanned or monitored at a first frequency or power level that is high enough and fast enough to detect an initial key press, but does not consume excessive power. The method determines if a key press was detected (604) and if no key press was detected (No at 604), the method waits for a period of time determined by the first scanning frequency or the low power monitoring circuit of the low power scanning mode (602) before scanning the key switches again (602) and determining if a key press was detected. If a key press was detected (Yes at 604), the method processes the key press (606) at a high power scanning mode (608) to detect subsequent key press. In the high power scanning mode, the key switches are scanned at a second scanning frequency that is higher than the first scanning frequency or low power monitoring method. As in the low power scanning mode, the high power scanning mode determines if a key press was detected (610), and if a key press was detected (Yes at 610) the key press is processed (612). The key processing is the same for both the low power and high power scanning modes. Once the key press is processed the high power scanning of the key switches continues (608). If no key press was detected (No at 610), it is determined if the high power scanning should end (614). High power scanning should end if no key presses have been detected for a threshold period of time. If the high power scanning should continue (No at 610), the key switches continue to be scanned at the second frequency of the high power scanning (608). If the high power scanning should end (Yes at 610), the scanning switches back to the lower power scanning (602).

The method 600 described with reference to FIG. 6 attempts to reduce power consumption by using a low power scanning mode to detect an initial key press and then switch to a high power scanning mode. Other techniques for reducing power consumption may be provided.

Figure 7:
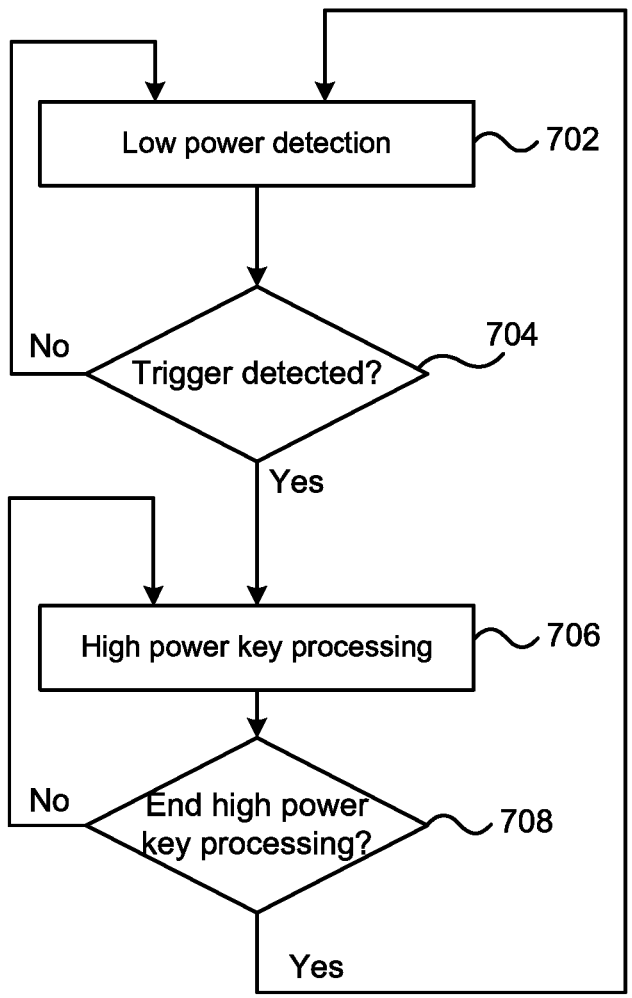
FIG. 7 depicts a further method of detecting a key press.

FIG. 7 depicts a further method of detecting a key press. The method 700 includes a low power detection 702 that tries to detect the occurrence of a particular trigger. If no trigger is detected (No at 704), the low power detection continues. If however, a trigger was detected (Yes at 704) high power key processing is performed to determine what key was pressed and process the key process accordingly. It is may be determined whether to continue with the high power key processing (No at 708) or to return to the low power detection (Yes at 708).

In contrast to method 600 which uses a low power scan mode to detect a key press and then switch to a high power scanning mode to detect subsequent key presses, the method 700 uses low power detection to detect a trigger and if the trigger is detected, high power key processing is used to determine what key was pressed and process it accordingly. The type of trigger detected may vary for different keyboards. For example, Piezo elements used in Piezo switches are sensitive to mechanical movement or deflections, and even small movements or deflections of the piezo elements can generate small but detectible voltages. These voltages can provide the trigger that is detected. The key press of the Piezo switch provides the trigger which can be used as a wake up interrupt to the keyboard circuits operating in a lower power detection mode. Upon waking from the low power detection mode, the high power key processing may detect which key was pressed from, for example, a remaining charge on the Piezo element.

Alternatively highly sensitive and low power consumption detection devices such as accelerometers can be incorporated into the keypad, which can be used to detect motion related vibrations or mechanical movements related to a keypress. The motion excited accelerometers can in turn trigger the keyboard circuits, powering them up to a high power key processing mode from a lower power mode.

Figure 8:
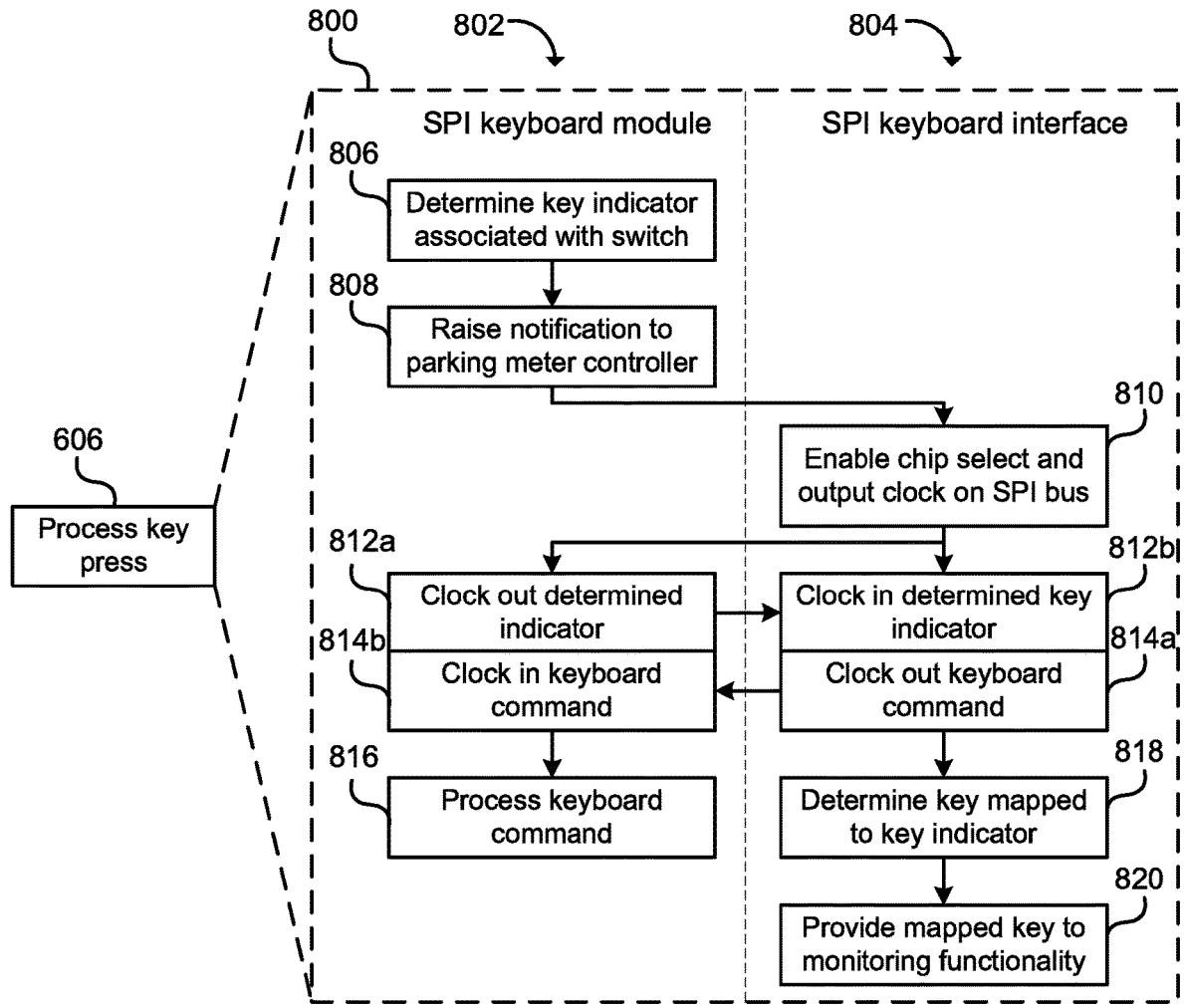
FIG. 8 depicts processing of a key press.

FIG. 8 depicts processing of a key press. Although depicted for the key press processing 606 in the low power mode, the same process may be performed for the key press processing 612 in the high power mode. The process 800 involves processing by both the SPI keyboard module 802 and the SPI keyboard interface 804 of the parking meter controller. The SPI keyboard module 802 determines an indicator associated with the key switch that was pressed (806) and then raises a notification to the SPI keyboard interface 804 of the parking meter controller (808). When the notification is raised, the SPI keyboard asserts the ATTN line in which the SPI bus is monitored to determine when it can transmit the indicator of the pressed key switch. The raised notification is detected by the SPI keyboard interface of the parking meter controller, and when the parking meter controller is ready to communicate with the SPI keyboard module 802, it enables the chip select signal line and generates the clock signal on the SPI bus (810). The SPI bus allows the simultaneous bi-directional communication, and as such, when the chip select signal is enabled, the SPI keyboard module 802 begins to clock out the determined indicator (812a) which is clocked in (812b) by the SPI keyboard interface 804. At the same time, if there is a command to transmit, the SPI keyboard interface 804 clocks out the command (814a) and the SPI keyboard module 802 clocks in the command (814b). Once the data is transferred, the chip select may be disabled, and the SPI keyboard module processes the keyboard command (816) if any that was received. Similarly, the SPI keyboard interface 804 processes the received indicator by mapping the received indicator using a key map (818) associated with the SPI keyboard module and then provides the mapped key to operating functionality of the parking meter controller (820).

The above has described an SPI keyboard module and corresponding interface that allows a parking meter to easily use different keyboard layouts without requiring additional changes to the parking meter controller. The operating functionality of the parking meter may be designed for a plurality of different parking meters, and as such may include functionality that may not be used by each parking meter. For example, one parking meter may have pay by plate functionality, while a second parking meter may simply meter an associated parking space. The operating functionality of both meters may be the same, however, the second parking meter would not use the pay by plate functionality. It is possible to enable and/or disable certain functionality based at least in part on the SPI keyboard attached to the parking meter controller.

Figure 9:
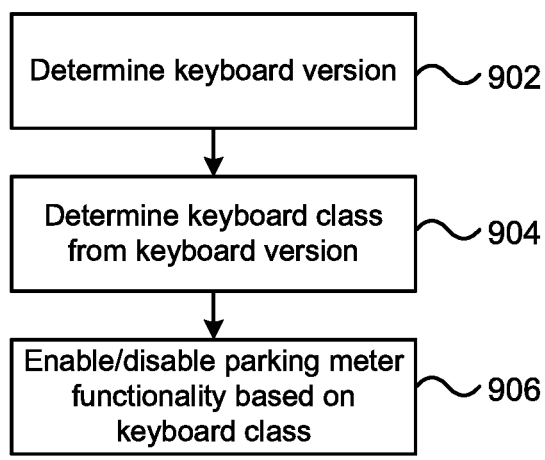
FIG. 9 depicts a process of configuring a parking meter.

FIG. 9 depicts a process of configuring a parking meter. The method 900 determines a version of the SPI keyboard module (902) attached to the parking meter controller and then determines a keyboard class from the keyboard version (904). Parking meter functionality, and/or components are then enabled and/or disabled based at least in part on the determined keyboard class (906).

Figure 10:
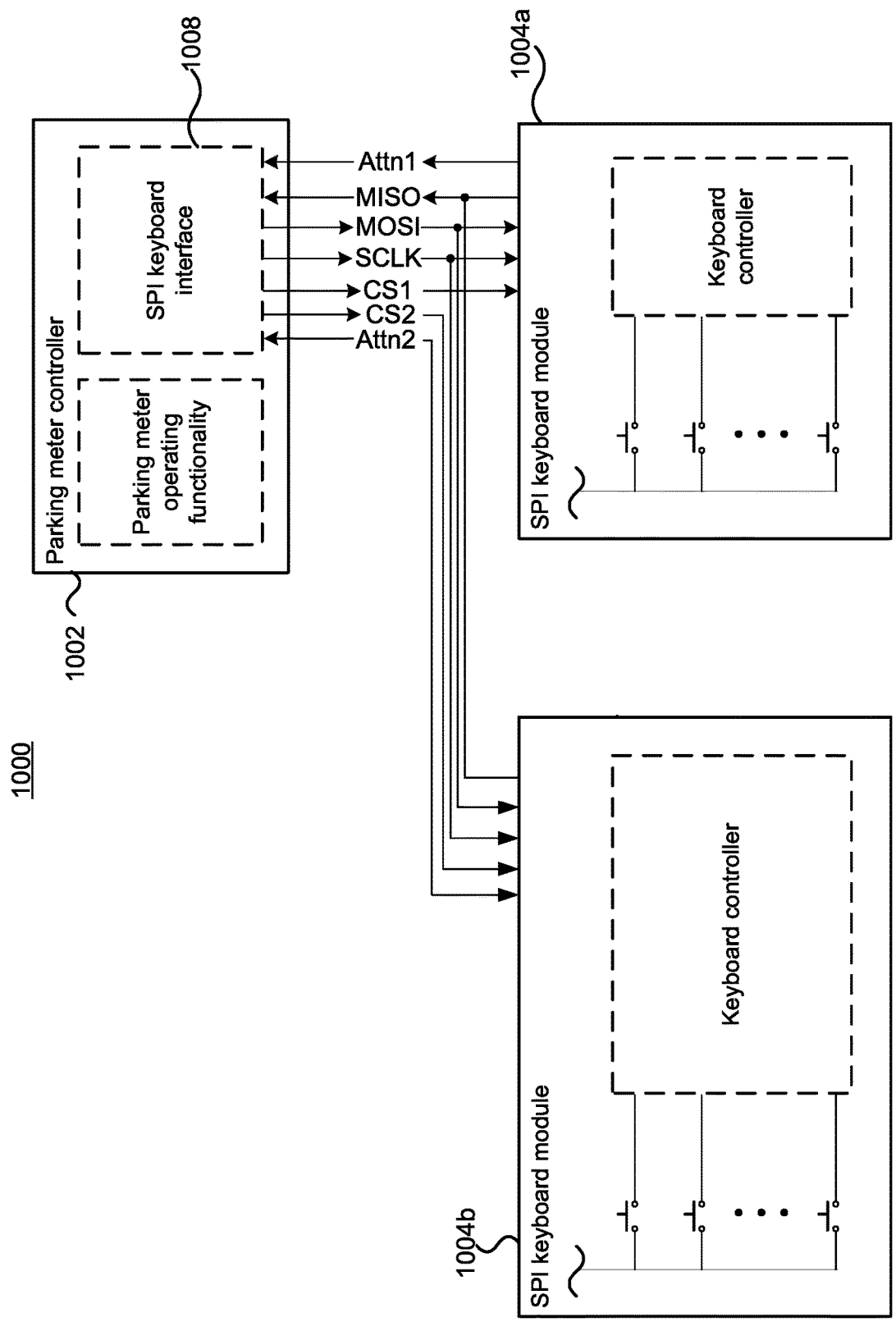
FIG. 10 depicts parking meter components of a parking meter incorporating multiple SPI keyboard modules.

FIG. 10 depicts parking meter components of a parking meter incorporating multiple SPI keyboard modules. The parking meter components 1000 are similar to those described above with regard to FIGS. 4 and 5 and as such only the differences will be discussed. The parking meter components 1000 include a parking meter controller 1002 however includes two SPI keyboard modules 1004a, 1004b. The different keyboard modules could be, for example an alphanumeric keyboard and a smaller keyboard with, for example enter and cancel keys. The use of multiple keyboards can provide greater flexibility in the design of the parking meter. Each of the SPI keyboard modules 1004a, 1004b are substantially the same, although the keyboard IDs may differ. Each keyboard module is connected to the parking meter controller by a common SCLK line, common MOSI line and common MISO line. However each SPI keyboard module 1004a, 1004b has its own ATTN signal line, ATTN1 for SPI keyboard module 1004a and ATTN2 for SPI keyboard module 1004b. Similarly, each keyboard module is connected to its own CS signal line, namely CS1 for SPI keyboard module 1002a and CS2 for SPI keyboard module 1002b. The SPI keyboard interface 1008 is augmented to detect the different notifications from ATTN lines and then assert the corresponding CS signal in order to communicate with the appropriate SPI keyboard module. The SPI keyboard interface 1008 may include a respective keyboard mapping corresponding to each of the different SPI keyboard modules 1004a, 1004b. The parking meter operating functionality does not require any indication that multiple different keyboards are connected and can simply receive from the SPI keyboard interface an indication of a key that was pressed, regardless of what particular keyboard module the pressed key was on.

The above has described an SPI keyboard module that provides flexibility in laying out the physical keys of the keyboard. As described further below, rather than using physical keys, a virtual keyboard may be provided in a similar manner by an SPI touch screen module.

Figure 11:
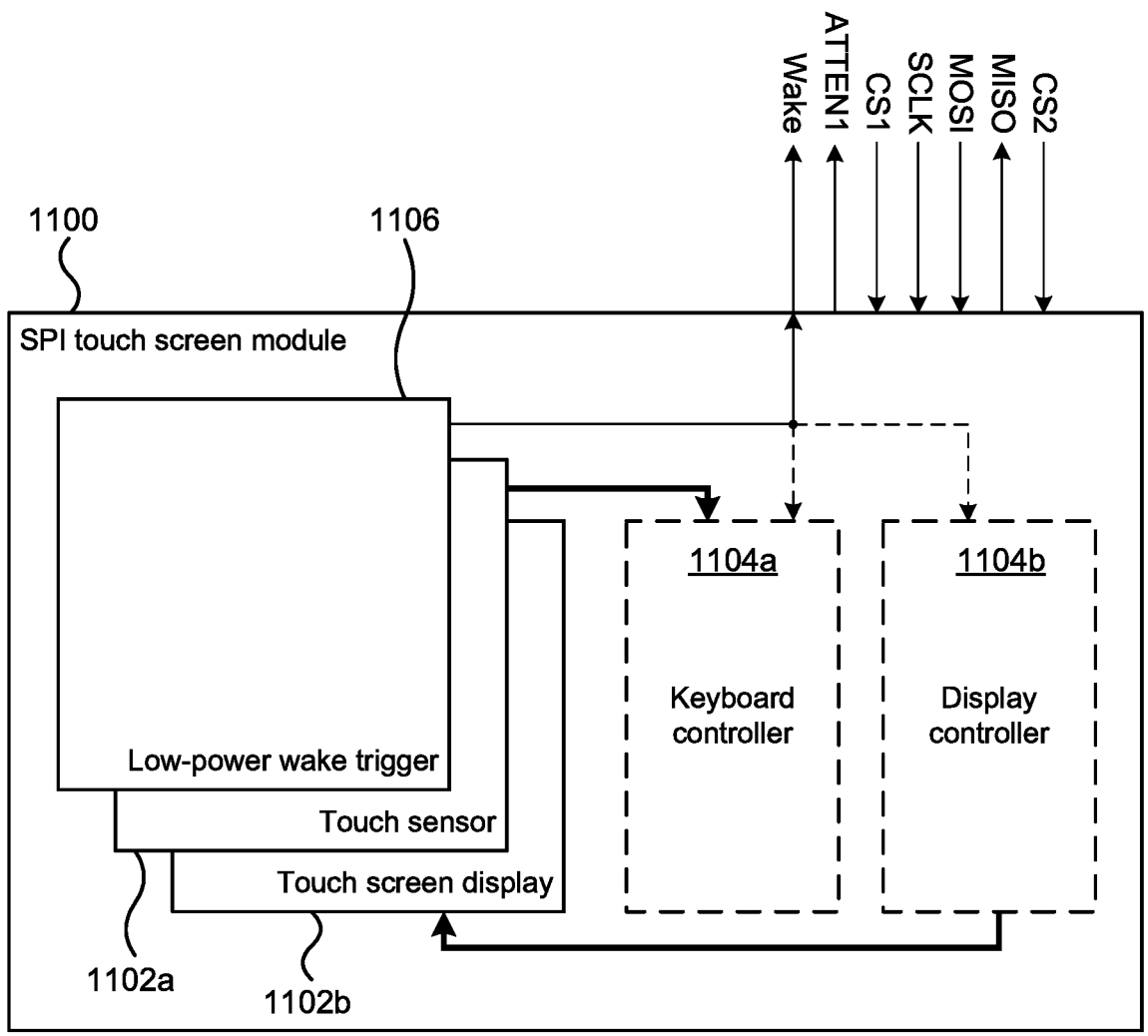
FIG. 11 depicts an SPI touch screen module.

FIG. 11 depicts an SPI touch screen module. An alternative low power SPI implementation of a virtual keyboard may be implemented using a touch screen over a display screen. Touch screen technology is quite common, and virtual keyboards can be created with a touch screen overlaid onto the display with visual "keys" placed at specific locations on the display. However in low power applications such as battery powered parking meters, having both the display and the touch screen technology always active consume a lot of power and is not practical. Some solutions to this incorporate a single "wake up" button adjacent to the screen that allows the touch screen to be turned on. While the adjacent switch or button provide an effective solution for conserving power, the additional requirement of having to press the adjacent button to power on the touch screen provides a less-than desirable user experience.

The SPI touch screen module 1100 comprises a touch sensor 1102a overlaying a touch screen display 1102. The touch sensor 1102 may provide input to a keyboard controller 1104a and the touch screen display 1102b may be controlled by a display controller 1104b. Both the keyboard controller 1104a and display controller 1104b may communicate with a parking meter controller (not shown) over an SPI bus interface. As depicted, the SPI bus interface may include different chip select lines, CS1 and CS2, for the keyboard controller and the display controller. Alternatively, a single CS line may be provided with the keyboard controller data being provided to the parking meter over the MISO line while the display controller receives display information, such as what to display, from the parking meter controller over the MOSI line.

In addition to touch sensor 1102a and the touch screen display 1102b, the SPI touch screen module may further include a low-power wake trigger 1106. The low-power wake trigger 1106 may be provided by for example as a secondary touch sensor overlaid on top of the touch sensor and the touch screen. The secondary touch sensor may only be required to provide an indication of whether a touch occurred, rather than also providing an indication of the coordinates of one or more touches. The low-power wake trigger 1106 can provide a wake signal to the parking meter controller (not shown) providing an indication that the touch screen display of the SPI touch screen module should be powered on or woken up. Additionally or alternatively, the wake signal may be provided to one or both of the keyboard controller 1104a and display controller 1104b.

Although depicted as an overlay on top of the touch sensor and touch screen display, the low-power wake trigger 1106 may be provided in other ways. For example a vibration sensor may be attached to the touch sensor and/or touch screen display to allow detection of vibrations caused by a user pressing or tapping on the screen. Additionally or alternatively, a piezo electric element or switch may be physically associated with the touch screen to detect an initial press on the touch screen. By incorporating an additional touch or vibration sensitive technology into the traditional touch screen solution, an initial finger press or touch anywhere on the touch screen display of the SPI touch screen module can be used as an initial wake up mechanism. Upon waking up, the touch screen display with touch sensor may become active. The combination of the touch screen with the low power wake trigger associated with the touch screen, conserves power as it allows the initial lower power touch or vibration sensor to trigger the system to wake up or provide an interrupt, which allows the higher powered virtual keyboard utilizing a touch sensor and touch screen display to become active and available to use.

Figure 12:
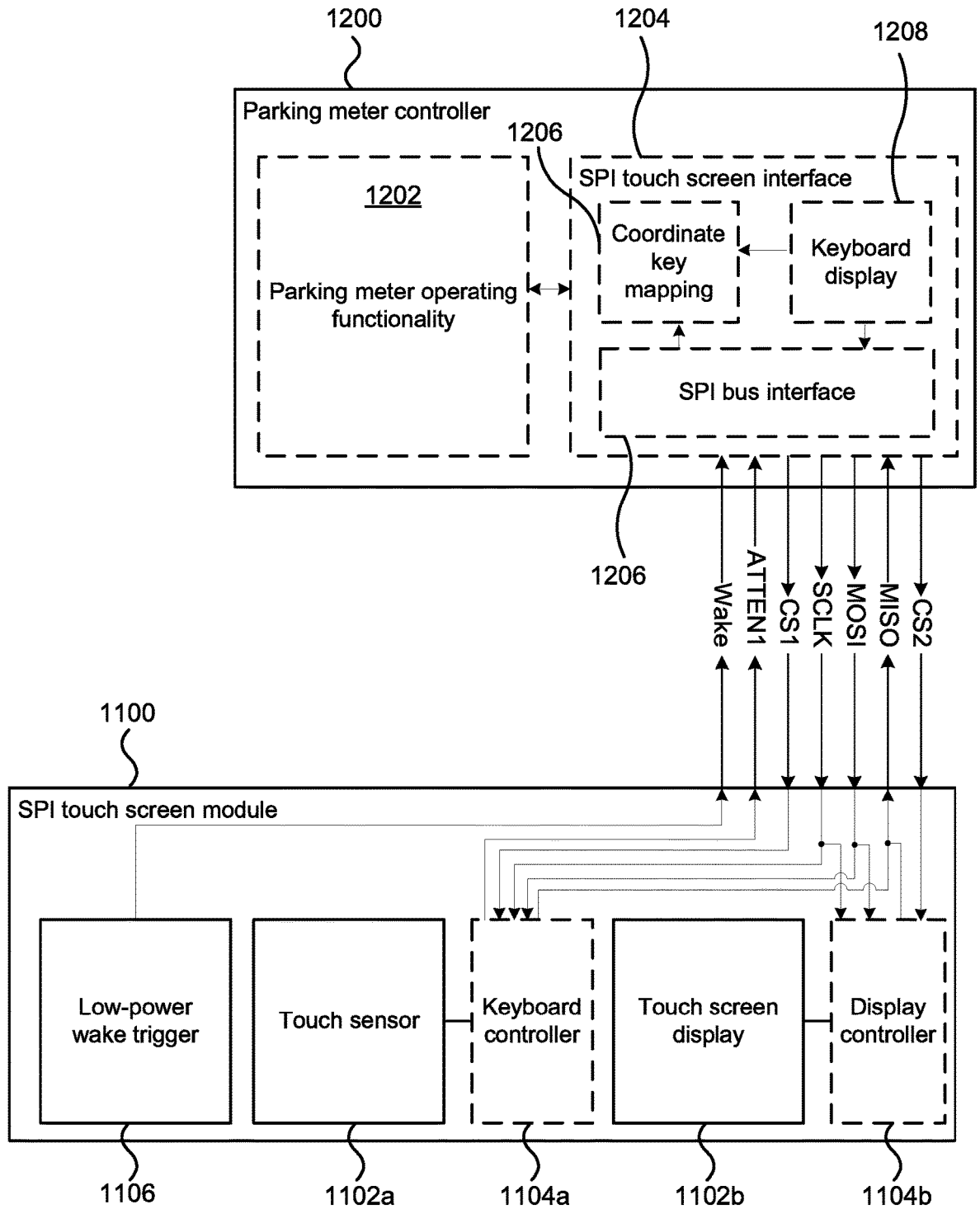
FIG. 12 depicts parking meter components of a further parking meter incorporating the SPI touch screen module of FIG. 11.

FIG. 12 depicts parking meter components of a further parking meter incorporating the SPI touch screen module of FIG. 11. The SPI touch sensor module 1100 is depicted as being connected to the parking meter controller 1200 via an SPI bus interface that includes the shared Serial Clock (SCLK) line, Maser Out Slave In (MOSI) line, and Master In Slave Out (MISO) line. The SPI bus interface is depicted as further including respective chip select (CS1, CS2) lines for the keyboard controller and display controller respectively, an attention (ATTEN1) line providing an indication that a key press, or rather a touch screen press, is ready to be transmitted, and a wake (Wake) line providing an indication to the parking meter controller 1200 that the touch screen display has been touched or pressed.

The parking meter controller 1200 may comprise parking meter operating functionality 1202 as well as SPI touch screen interface functionality 1204. The SPI touch screen interface functionality 1204 is similar to the SPI keyboard interface functionality described above. While the SPI keyboard interface functionality maps a key switch that was pressed to a corresponding key using a particular key map associated with the particular SPI keyboard module, the SPI keyboard interface functionality maps a screen location that was pressed to a corresponding key using a coordinate key mapping 1206 associated with the particular screen displayed on the touch screen display 1102. The SPI touch screen interface functionality may include keyboard display functionality 1208 that may interact with the parking meter operating functionality 1202 in order to display, or more particularly cause the SPI touch sensor module to display, an appropriate virtual keyboard screen, or other appropriate or desired screen. Information about the location of displayed keys may be provided to both the keyboard display functionality 1208 and the coordinate key mapping functionality 1206 in order to map a press on the touch sensor to a particular key displayed at the pressed location. The indication of the pressed location as well as the display information may be transmitted between the SPI touch sensor module 1100 and the parking meter controller 1200 over the SPI bus interface. As described above, a wake signal may be provided to the parking meter controller from the low power wake trigger 1106 on the SPI touch sensor module. The wake signal may also be provided to the display controller 1104b and possibly the keyboard controller 1104a. Upon receiving the wake signal from low-power wake trigger 1106, the parking meter controller 1200 determine what should be displayed on the touch screen display 1102b and transmit the appropriate data to the SPI touch sensor module to 1100 using the SPI bus interface functionality 1206 to cause the SPI touch sensor module to display the screen on the touch screen display.

The touch sensor 1102a and keyboard controller 1104a of the SPI touch sensor module 1100 may send an indication of a pressed location on the touch sensor 1102a overlaying the touch screen display in a similar manner that the keyboard controller of the SPI keyboard module described above sends an indication of the pressed key switch to the parking meter controller. In particular, the keyboard controller may set the signal on the ATTEN1 signal line to indicate to the parking meter controller that touch data is available for transmission. When the CS1 line signal is set, the location information indicating the location of the press or touch on the screen may be transmitted over the MISO signal line.

SPI keyboards for parking meters have been described above. As described above, the SPI keyboards may include various different layouts of physical keys as well as virtual keys displayed on a touch screen. The SPI keyboards can provide low power operation which may be desirable in parking meters and in particular in single space parking meters. Further, parking meters may incorporate a plurality of individual SPI keyboards. The SPI keyboards may identify the particular key layout to the parking meter and as such SPI keyboards having different layouts can be easily swapped without having to reconfigure the programming of the parking meter.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the components and processes described herein may be provided by various combinations of software, firmware and/or hardware, other than the specific implementations described herein as illustrative examples.

Numerous additional variations on the methods and apparatus of the various embodiments described above will be apparent to those skilled in the art in view of the above description. Such variations are to be considered within the scope.

What is claimed is:

1. A parking meter comprising:
   at least one parking meter controller executing instructions to configure the parking meter to provide:
      operating functionality; and
      a keyboard interface comprising a serial peripheral interface (SPI) bus interface; and
   an SPI keyboard module connected to the at least one parking meter controller by an SPI bus, the SPI keyboard module comprising:
      a plurality of key switches; and
      at least one keyboard controller configured to:
         detect pressing of a key switch of the plurality of key switches;
         determine a predetermined indicator associated with the detected key switch that was pressed; and
         transmit over the SPI bus the predetermined indicator associated with the pressed key to the keyboard interface of the at least one parking meter controller,
   wherein the at least one parking meter controller receives the transmitted predetermined indicator associated with the pressed key and determines an associated functionality of the pressed key based on the received predetermined indicator,
   wherein the keyboard interface determines a keyboard identifier of the SPI keyboard module and selects a keyboard mapping associated with the SPI keyboard module based on the keyboard identifier,
   wherein the keyboard interface uses the keyboard mapping to map the received predetermined indicator to a particular key.

2. The parking meter of claim 1, wherein the keyboard identifier is communicated to the operating functionality and the operating functionality enables or disables one or more features of the parking meter based on the keyboard identifier.

3. The parking meter of claim 1, wherein the SPI bus comprises:
   a chip select (CS) signal line associated with the SPI keyboard module for carrying a chip select signal indicative of when the keyboard module can transmit to the at least one keyboard controller;
   a serial clock (SCLK) signal line for carrying a clock signal for controlling signal timing;
   a master in slave out (MISO) signal line for carrying serially transmitted data from the SPI keyboard module to the at least one parking meter controller; and
   a master-out-slave-in (MOSI) signal line for carrying serially transmitted data from the at least one parking meter controller to the SPI keyboard module.

4. The parking meter of claim 3, wherein the keyboard controller is configured to:
   monitor the CS signal line in a transmission mode when data is to be transmitted to the at least one parking meter controllers.

5. The parking meter of claim 4, further comprising an attention (ATTN) signal line connecting the SPI keyboard module to the at least one parking meter controller, and wherein the keyboard controller is configured to:
   switch from a sleep mode to the transmission mode when a key press is detected; and
   raise a signal on the ATTN signal line providing an indication to the at least one parking meter controller that there is data to transmit.

6. The parking meter of claim 5, wherein the keyboard controller is further configured to:

switch from the transmission mode to the sleep mode when there is no more data to transmit to the at least one parking meter controller.

7. The parking meter of claim 1, wherein the keyboard controller detects pressing of the key switch by:
   detecting a trigger indicative of pressing of the key switch; and
   scanning the plurality of key switches to determine which key switch was pressed.

8. The parking meter of claim 1, wherein the keyboard interface transmits a keyboard command comprising a command identifier to the SPI keyboard module over the SPI bus, and wherein the keyboard controller of the SPI keyboard module receives and processes the keyboard command.

9. The parking meter of claim 8, wherein the keyboard command comprises one or more of:
   a mode command changing an operating mode of the SPI keyboard module;
   a configuration command setting a configuration parameter value of the SPI keyboard module;
   a query command querying configuration parameter values of the SPI keyboard module; and
   an action command causing the SPI keyboard module to perform an action.

10. The parking meter of claim 1, wherein the SPI keyboard module further comprises a feedback device capable of providing feedback of key presses.

11. The parking meter of claim 1, wherein the SPI keyboard module further comprises a light emitting diode (LED) device for lighting at least a portion of the plurality of key switches.

12. The parking meter of claim 1, wherein the parking meter is a single space parking meter.

13. The parking meter of claim 1, wherein the parking meter is a multi-space parking meter.

14. The parking meter of claim 1, further comprising a second SPI keyboard module connected to the at least one parking meter by the SPI bus.

15. An SPI keyboard module for connection to a parking meter controller in a parking meter by an SPI bus, the SPI keyboard module comprising:
   a plurality of key switches; and
   at least one keyboard controller configured to:
      detect pressing of a key switch of the plurality of key switches;
      determine a predetermined indicator associated with the detected key switch that was pressed; and
      transmit over the SPI bus the predetermined indicator associated with the pressed key to the keyboard interface of the parking meter controller; and
      transmit over the SPI bus a keyboard identifier of the SPI keyboard module for use in selecting by the parking meter controller a keyboard mapping associated with the SPI keyboard module, wherein the keyboard mapping selected based on the transmitted keyboard identifier allows the parking meter controller to map the predetermined indicator to a particular key,
   wherein the transmitted predetermined indicator allows the parking meter controller to determine an associated functionality of the pressed key based on the transmitted predetermined indicator.

16. The SPI keyboard module of claim 15, wherein the SPI bus comprises:
   a chip select (CS) signal line associated with the SPI keyboard module for carrying an chip select signal indicative of when the keyboard module can transmit to the keyboard controller;
   a serial clock (SCLK) signal line for carrying a clock signal for controlling signal timing;
   a master in slave out (MISO) signal line for carrying serially transmitted data from the SPI keyboard module to the parking meter controller; and
   a master-out-slave-in (MOSI) signal line for carrying serially transmitted data from the parking meter controller to the SPI keyboard module.

17. The SPI keyboard module of claim 16, wherein the keyboard controller is configured to:
   monitor the CS signal line in a transmission mode when data is to be transmitted to the parking meter controllers.

18. The SPI keyboard module of claim 17, further comprising a connector to an attention (ATTN) signal line for connecting the SPI keyboard module to the parking meter controller, and wherein the keyboard controller is configured to:
   switch from a sleep mode to the transmission mode when a key press is detected; and
   raise a signal on the ATTN signal line through the connector providing an indication to the parking meter controller that there is data to transmit.

19. The SPI keyboard module of claim 18, wherein the keyboard controller is further configured to:
   switch from the transmission mode to the sleep mode when there is no more data to transmit to the parking meter controller.

20. The SPI keyboard module of claim 15, wherein the keyboard controller detects pressing of the key switch by:
   detecting a trigger indicative of pressing of the key switch; and
   scanning the plurality of key switches to determine which key switch was pressed.

21. The SPI keyboard module of claim 15, wherein the keyboard controller is configured to receive and process a keyboard command comprising a command identifier over the SPI bus.

22. The SPI keyboard module of claim 21, wherein the keyboard command comprises one or more of:
   a mode command changing an operating mode of the SPI keyboard module;
   a configuration command setting a configuration parameter value of the SPI keyboard module;
   a query command querying configuration parameter values of the SPI keyboard module; and
   an action command causing the SPI keyboard module to perform an action.

23. The SPI keyboard module of claim 15, further comprising a feedback device capable of providing feedback of key presses.

24. The SPI keyboard module of claim 15, wherein the SPI keyboard module further comprises an LED device for lighting at least a portion of the plurality of key switches.

* * * * *